United States Patent
Longano

(10) Patent No.: US 11,869,037 B2
(45) Date of Patent: Jan. 9, 2024

(54) INTEGRATING CONTENT-DELIVERY PLATFORMS INTO PROGRAMMATIC ENVIRONMENTS GENERATED BY EXECUTED APPLICATIONS

(71) Applicant: gStore LLC, New Canaan, CT (US)

(72) Inventor: Nicholas Francesco Longano, New Canaan, CT (US)

( * ) Notice: Subject to any disclaimer, the term of this patent is extended or adjusted under 35 U.S.C. 154(b) by 0 days.

(21) Appl. No.: 16/875,251

(22) Filed: May 15, 2020

(65) Prior Publication Data

US 2020/0364746 A1  Nov. 19, 2020

Related U.S. Application Data

(60) Provisional application No. 62/849,680, filed on May 17, 2019.

(51) Int. Cl.
  *G06Q 30/0251* (2023.01)
  *G06N 5/04* (2023.01)
  *G06N 20/00* (2019.01)

(52) U.S. Cl.
  CPC .......... *G06Q 30/0254* (2013.01); *G06N 5/04* (2013.01); *G06N 20/00* (2019.01)

(58) Field of Classification Search
  CPC ....... G06Q 30/0207–30/0277; G06Q 30/0254; G06N 20/00; G06N 5/04
  USPC ........................................ 705/14, 319, 14.52
  See application file for complete search history.

(56) References Cited

U.S. PATENT DOCUMENTS

| | | | |
|---|---|---|---|
| 2008/0189175 A1* | 8/2008 | Chan | G06Q 30/0239 705/14.5 |
| 2009/0029752 A1* | 1/2009 | Sispoidis | G06Q 30/02 463/43 |
| 2010/0036727 A1* | 2/2010 | Sarelson | G06Q 30/0246 705/14.69 |
| 2011/0014972 A1* | 1/2011 | Herrmann | G07F 17/3237 463/25 |
| 2012/0209571 A1* | 8/2012 | Peterson | G06F 11/3616 702/186 |
| 2013/0006734 A1* | 1/2013 | Ocko | G06Q 30/02 705/14.57 |

(Continued)

OTHER PUBLICATIONS

Method and system for Determining Fine Grained User Interest from Search Advertisements and Display Advertisements (Year: 2010).*

(Continued)

*Primary Examiner* — Gautam Ubale
(74) *Attorney, Agent, or Firm* — Duane Morris LLP

(57) ABSTRACT

The disclosed exemplary embodiments include computer-implemented systems, apparatuses, and processes that, among other things, provide a marketplace platform accessed within various application environments, such as a gaming environment associated with a video game. The market platform automatically determines product advertisements that appropriate for presentation within the gaming environment based on an application of trained machine learning and artificial intelligence models to selected elements of input data, and facilitates a purchase of advertised products without a user's exit from the gaming environment by maintaining centralized elements of profile data characterizing the user.

22 Claims, 15 Drawing Sheets

(56) References Cited

U.S. PATENT DOCUMENTS

| | | | | |
|---|---|---|---|---|
| 2013/0124298 A1* | 5/2013 | Li | | G06Q 30/0241 |
| | | | | 705/14.42 |
| 2013/0231179 A1* | 9/2013 | Sproule | | G06Q 30/0269 |
| | | | | 463/29 |
| 2013/0297411 A1* | 11/2013 | van Datta | | H04N 21/8583 |
| | | | | 705/14.45 |
| 2013/0339333 A1* | 12/2013 | Stekkelpak | | G06Q 30/0256 |
| | | | | 707/706 |
| 2014/0344034 A1* | 11/2014 | Goodman | | G06Q 30/0241 |
| | | | | 705/14.12 |
| 2015/0186913 A1* | 7/2015 | Mann | | G06Q 30/0219 |
| | | | | 705/14.21 |
| 2015/0258447 A1* | 9/2015 | Ellis | | G06Q 30/0267 |
| | | | | 463/31 |
| 2016/0307395 A1* | 10/2016 | Frenkel | | G07F 17/3255 |
| 2017/0061528 A1* | 3/2017 | Arora | | G06F 16/951 |
| 2017/0157512 A1* | 6/2017 | Long | | A63F 13/497 |
| 2017/0264681 A1* | 9/2017 | Apte | | H04W 12/08 |
| 2017/0323340 A1* | 11/2017 | Jeon | | G06Q 30/0261 |
| 2018/0157981 A1* | 6/2018 | Albertson | | G06N 3/006 |
| 2019/0114662 A1* | 4/2019 | Bennion | | G06N 20/00 |
| 2020/0160385 A1* | 5/2020 | Chan | | G06Q 30/0255 |
| 2021/0150608 A1* | 5/2021 | Wu | | G06Q 30/0631 |

OTHER PUBLICATIONS

PlayMancer: a Serious Gaming 3D Environment (Year: 2008).*

Thesamevideogamein2D,3Dorvirtual reality—Howdoestechnologyimpactgame evaluationandbrandplacements (Year: 2018).*

Evaluating_Adversarial_Interfaces_An_Automated_Approach (Year: 2016).*

* cited by examiner

INTEGRATING CONTENT-DELIVERY PLATFORMS INTO PROGRAMMATIC ENVIRONMENTS GENERATED BY EXECUTED APPLICATIONS

CROSS-REFERENCE TO RELATED APPLICATIONS

The application claims the benefit of U.S. Provisional Patent Application No. 62/849,680, filed May 17, 2019, which is hereby incorporated by reference in its entirety.

TECHNICAL FIELD

The disclosed embodiments generally relate to computer-implemented systems and processes that integrate content-delivery platforms into programmatic environments generated by executed applications.

BACKGROUND

Today, the popularity of online or digital gaming continues to increase among certain age groups of particular interest to digital retailers and other merchants. In many instances, however, conventional processes for targeting advertising to potential customers within a gaming environment not only distract these potential customers from the gaming environment, but also provide content of limited relevance to the potential customers that requires these potential customers to exist the gaming environment prior to interacting with digital portals or web pages associated with merchants or retailers. As such, these conventional processes often result in limited engagement between the potential customers and the retailers or merchants, which significantly decreasing the engagement of these potential customers with the gaming environment.

SUMMARY

In some examples, an apparatus includes a communications unit, a non-transitory computer-readable medium that can store instructions, and at least one processor coupled to the communications unit and the computer-readable medium. The at least one processor is configured to execute the executable instructions to cause the apparatus to receive a first signal from a computing device via the communications unit, the first signal comprising event data identifying a user and a game of a plurality of games. The at least one processor is also configured to execute the executable instructions to obtain user data for the user identifying at least one previous activity with a marketplace that serves the plurality of games. Further, the at least one processor is configured to execute the executable instructions to obtain retail data identifying a plurality of product advertisements. The at least one processor is also configured to execute the executable instructions to apply a machine learning model to the user data and the retail data. The at least one processor is further configured to execute the executable instructions to determine at least one product advertisement for the user based on application of the machine learning model. The at least one processor is also configured to execute the executable instructions to generate advertisement data identifying the at least one product advertisement. The at least one processor is also configured to execute the executable instructions to transmit the advertisement data to the computing device.

In other examples, a computer-implemented method by at least one processor includes receiving a first signal from a computing device via the communications unit, the first signal comprising event data identifying a user and a game of a plurality of games. The method also includes obtaining user data for the user identifying at least one previous activity with a marketplace that serves the plurality of games. The method further includes obtaining retail data identifying a plurality of product advertisements. The method also includes applying a machine learning model to the user data and the retail data. Further, the method includes determining at least one product advertisement for the user based on application of the machine learning model. The method also includes generating advertisement data identifying the at least one product advertisement. The method further includes transmitting the advertisement data to the computing device.

In yet other examples, a non-transient computer-readable storage medium comprises computer-executable instructions stored tangibly thereon. The instructions, when executed by one or more processors, cause the one or more processors to perform operations including receiving a first signal from a computing device via the communications unit, the first signal comprising event data identifying a user and a game of a plurality of games. The operations also include obtaining user data for the user identifying at least one previous activity with a marketplace that serves the plurality of games. The operations further include obtaining retail data identifying a plurality of product advertisements. The operations also include applying a machine learning model to the user data and the retail data. Further, the operations include determining at least one product advertisement for the user based on application of the machine learning model. The operations also include generating advertisement data identifying the at least one product advertisement. The operations further include transmitting the advertisement data to the computing device.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
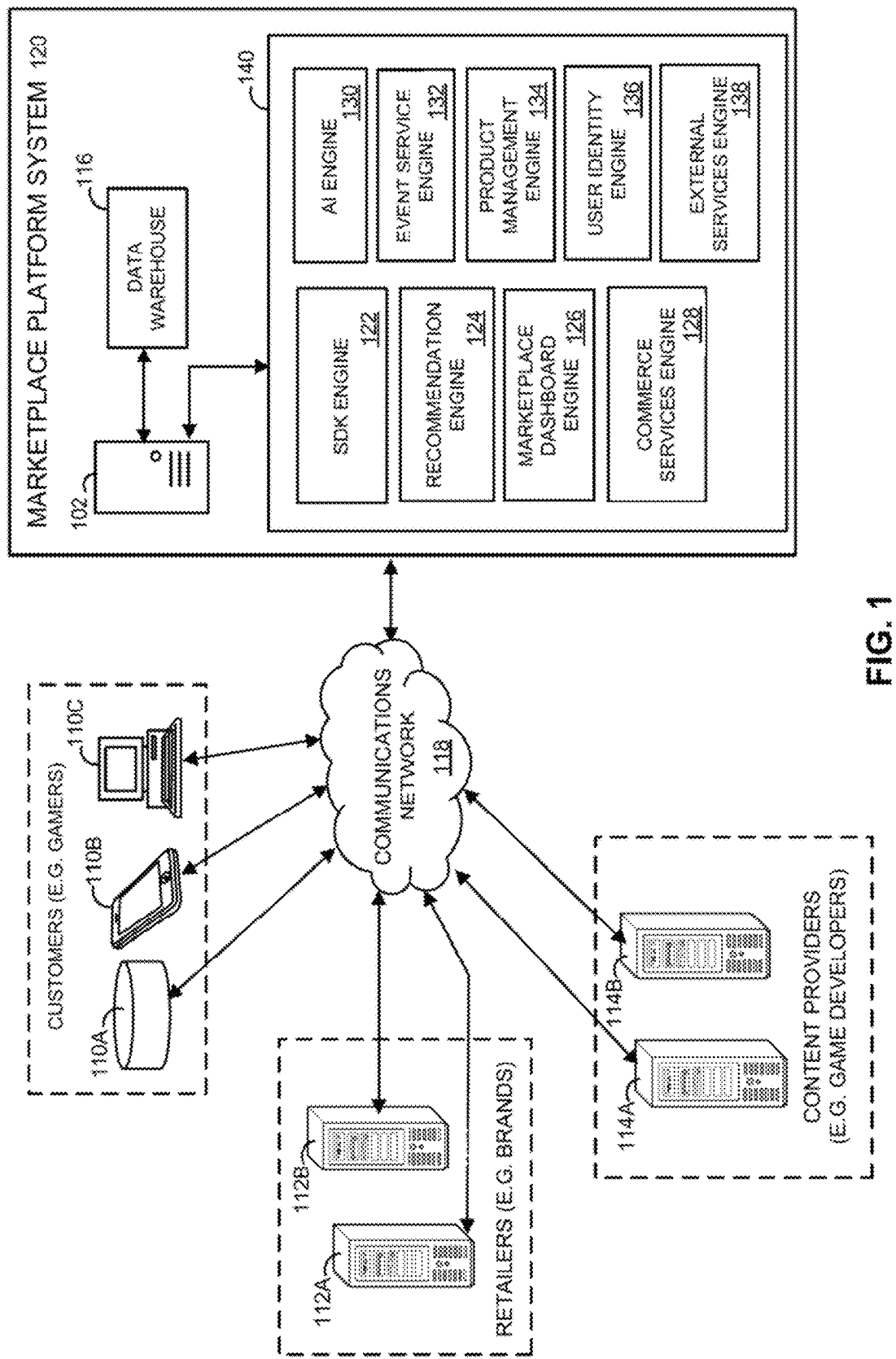
FIG. 1 is a block diagram of an exemplary computing environment, in accordance with some embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise.

This application relates to computer-implemented apparatuses, methods, and processes that provide a cloud-based platform accessible directly through executed application programs that integrate a software development kit (SDK) associated with the platform. The cloud-based marketplace platform may, for example, match together candidate advertising content to these executed application programs and to the users of these applications, and may provision the matched advertising content to these executed applications for presentation within a corresponding platform-specific graphical user interface (GUI).

In some examples, the cloud-based platform may be associated with a digital marketplace, and executable applications programs may include a gaming application that, upon execution by a computing system or device, presents one or more elements of digital content within a corresponding gaming interface, which collectively establishes the gaming environment. The one or more elements of digital content may also include a selectable interface element that, upon selection by a user, triggers the presentation by the executed gaming application, of the platform-specific GUI with the gaming interface. The platform-specific GUI may, for example, obscure all or a selected portion of the digital content establishing the gaming environment, and may enable the user to interact with the digital marketplace within exiting the gaming environment.

Further, the advertising content presented within the platform-specific GUI may be appropriate to the gaming application and further, tailored to the interests of the user and to the user's prior interactions with both the gaming environment and the digital marketplace. Further, in certain exemplary embodiments, the digital marketplace described herein may aggregates multiple users across multiple gaming environments, and may enable these users to purchase products or services associated with the targeted advertising content without exiting the gaming environment. Further, and responsive to each purchase by a user, the digital platform may perform any of the exemplary processes described herein to allocate units of marketplace credits to the user, which may be exchanged for in-game credits and rewards FIG. 1 is a diagram illustrating an exemplary computing environment 100, consistent with certain disclosed embodiments. For example, as illustrated in FIG. 1, computing environment 100 may include a marketplace platform system 120, one or more customer computing devices 110A, 110B, and 110C, one or more retailer computing devices 112A and 112B, and one or more content-provider computing devices 114A and 1146, each of which may be operatively connected to communications network 118. The disclosed embodiments are, however, not limited to these exemplary computing systems and devices, and in other examples, environment 100 may include any additional, or alternate, number or type of marketplace platform systems, customer computing devices, retailer computing devices, and content provider computing devices that collectively implement the exemplary processes described herein.

In some instances, each of retailer computing devices 112A and 112B may be operated by a corresponding retailer, merchant, or other business entity that offers branded products or services to customer. Further, each of customer computing devices 110A, 110B, and 110C may be operated by a corresponding user, and each of customer computing devices 110A, 110B, and 110C may locally store, and execute, one or more application programs, which include, but are not limited to, a mobile application program, a web browser, and a gaming application. Additionally, in some examples, each of content provider computing devices 114A and 114B may be a developer of one or more of the application programs executed at customer computing devices 110A, 110B, and 110C.

By way of example, the one or more application programs executed by customer computing devices 110A, 110B, and 110C may include a gaming application, and the users that operate customer computing devices 110A, 110B, and 110C may represent "garners" that interact with and play a video game associated with the gaming application. In some instances, one or more of content provider computing devices 114A and 114B may be configured to perform operations that provision the gaming application to corresponding ones of customer computing devices 110A, 110B, and 110C and additionally, or alternatively, that provision one or more video games to the gaming application or to an additional application program, such as a web browser, executed by one or more of customer computing devices 110A, 110B, 110C. For example, one or more of content provider computing devices 114A and 114B may include server that hosts the video games, and an application program executed by one or more of customer computing devices 110A, 110B, 110C, such as the gaming application or the web browser, may establish a secure channel of communications with one or more of content-provider computing devices 114A and 114B (e.g., over communication network 118), and may access digital content associated with one or more of the hosed video games for presentation within a corresponding interface, e.g., to enable the user to interact with and play the one or more video games.

Examples of communications network 118 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within environment 100 may perform operations that establish and maintain one or more secure channels of communication across network 118, such as, but not limited to, a transport layer security (TSL) channel, a secure socket layer (SSL) channel, or any other suitable secure communication channel.

In some embodiments, marketplace platform system 120 may include one or more marketplace computing devices 102 (e.g., servers, such as cloud-based servers) having one or more tangible, non-transitory memories that store data and/or software instructions, such as instruction memory 140, and one or more processors, configured to execute the software instructions. The one or more tangible, non-transitory memories may, in some examples, store application programs, application modules, and other elements of code executable by the one or more processors.

For example, as illustrated in FIG. 1, marketplace platform system 120 may maintain, within instruction memory 140, executable software instructions that include, but are not limited to, a software development kit (SDK) engine 122, a recommendation engine 124, a marketplace dashboard engine 126, a commerce services engine 128, an artificial intelligence (AI) engine 130, an event service engine 132, a product management engine 134, a user identity engine 136, and an external services engine 138.

Although in this example each of SDK engine 122, recommendation engine 124, marketplace dashboard engine 126, commerce services engine 128, artificial intelligence (AI) engine 130, event service engine 132, product management engine 134, user identity engine 136, and external services engine 138 are implemented as executable software instructions stored within instruction memory 140 and executed by one or more processors, in other embodiments one or more of SDK engine 122, recommendation engine 124, marketplace dashboard engine 126, commerce services engine 128, artificial intelligence (AI) engine 130, event service engine 132, product management engine 134, user identity engine 136, and external services engine 138, or portions thereof, may be implemented in hardware (e.g., in an FPGA, ASIC, using discrete logic, etc.).

SDK engine 122 may, upon execution, perform operations that provision a software development kit (SDK) to one or more of content provider computing devices 114A and 114B. In some instances, the provisioned SDK may be integrated into an application program, such as, but not limited to, a gaming program, which may be provisioned to and executed by one or more of customer computing devices 110A, 110B, and 110C. By integrating the SDK into the application program (e.g., the gaming application), the execution of the application program and the integrated SDK may enable the application program to interact with, and to participate in, an electronic marketplace established and maintained by marketplace platform system 120 using any of the exemplary processes described herein.

In some instances, the integrated and executed SDK may cause the application program (e.g., the gaming application) to generate and present a graphical user interface (GUI) that facilitates access to the marketplace platform system 120. For example, a user interacting with a gaming application may, while playing a corresponding video game, may engage or select a marketplace icon within the video game, which may cause the executed gaming application (and integrated SDK) to display the GUI, which providing the user access to a marketplace hosted by the marketplace platform system 120. As described herein, the presented GUI may obscure at least a portion of the digital content generated by the executed application program (e.g., the gaming application), or alternatively, may obscure the digital content generated by the executed gaming application, and the executed gaming application may access the GUI, and the marketplace, without exiting the video game. In some instances, also described herein, the user may elect to purchase products and services offered for sale through the GUI, and the game developers (e.g., associated with corresponding one of content provider computing devices 114A and 114B) may receive a revenue share of purchases made through their games on the marketplace.

In further example, the integration of the SDK into the application program (e.g., the gaming application, another application program, etc.) may cause the executed application to monitor an interaction of the user with the executed application program and the GUI, and to perform operations that cause the corresponding one of customer computing devices 110A, 110B, or 110B to transmit data, e.g., event data characterizing the monitored interaction to marketplace platform system 120. By way of example, and for the gaming application, the event data may identify actions a user takes within the game such as, for example, the activation of the marketplace icon, the viewing of product advertisements, and purchases made by the user from the marketplace.

Event data may also identify the creation of a new user account at marketplace platform system 120, which may include user profile data. For example, and using certain of the processes described herein, a user playing a game hosted by content provider computing device 114A may engage a marketplace icon displayed within the game and, in response, may be prompted by one or more interface elements of the presented GUI to create a marketplace account (e.g., via an icon that displays "Click here to create account"). In response, the user may provide, as input to a corresponding one of customer computing devices 110A, 110B, or 110C, one or more login or authentication credentials (e.g., alphanumeric username and password), which the corresponding one of customer computing devices 110A, 110B, or 110C may transmit across network 118 to marketplace platform system 120 via a secure, programmatic interface. In some instances, marketplace platform system 120 may perform operations that generate new user account data identifying the login and authentication data, which may be locally stored within a data repository (e.g., data warehouse 116), and which may identify the user across additional or alternate video game operable with marketplace platform system 120 and the marketplace. The marketplace account created may be valid and accessible from a plurality of games that include an integrated SDK.

Further, elements of the event data may identify when a user views a particular product advertisement within the GUI, purchases a product through the GUI, or logs into or out of the marketplace (e.g., based on input provided to the GUI). The elements of the event data may also characterize the user's interaction with an executed gaming application, such as, but not limited to, identifying the user's progress in game play, e.g., by identifying a number of point the user has achieved in a game or a game level that the user has reached in the game. The disclosed embodiments are, however, not limited to gaming applications, and in other instances, the elements of the event data may identify and characterize the user's interaction with any additional, or alternate, application program integrating the provisioned SDK and executable by customer computing devices 110A, 110B, and 110C.

In some examples, each of the executed application programs, such as the gaming application described herein, may perform operations (via the integrated SDK) that cause a corresponding one of customer computing devices 110A, 110B, or 110C to transmit the generated elements of event data across network 118 to marketplace platform system 120. A programmatic interface established and maintained by marketplace platform system 120, such as an application programming interface (API) may receive and route the elements of event data to event service engine 132 (e.g., directly or via SDK engine 122), which may store the elements of event data within data warehouse 116.

User identity engine 136 may, upon execution, perform operations that manage and federate user profiles and a creation of corresponding user accounts that the marketplace that can be accessed across applications programs and gaming applications that integrated the SDK described herein. For example, event service engine 132 may receive, from an SDK integrated into a gaming application executed by customer computing device 110A, 110B, or 110C, event data that includes user data (e.g., user profile data) that requests a creation of a new user account. Event service engine 132 may provide the event data as an input to user identity engine 136, which perform operations that generate an account for the user within marketplace platform system 120, and that generate account data identifying and characterizing that newly generated account and profile data characterizing the user.

The profile data may, for example, include information that identifies the user (e.g., the user's name), the user's street or shipping address, payment information that identifies and characterize a payment instrument available for purchases via any of the exemplary processes described herein, and demographic data characterizing the user, such as the user's age, gender, of occupation. In some instances, the profile data may also identify and characterize one or more user-specific preferences for types or genres of video games and gaming applications (e.g., role-playing games, etc.), or for types or brands of products or services offered for sale through the marketplace described herein (e.g., particular brands of shoes, shoe sizes, etc.). User identity engine 136 may store the profile data and corresponding account data in data warehouse 116.

In some examples, executed AI engine 130 may perform operations that, among other things, select product advertisements appropriate to a particular user based on locally maintained profile data characterizing that user and on additional elements of event data characterizing that user's interaction with an executed application program, such as a video game accessed via an executed gaming application or web browser. For instance, executed AI engine 130 may perform operations that select product advertisements appropriate to the particular user based on an application of one or more rules to selected elements of the profile and/or event data. For example, the applied rules may include, but are not limited to: (i) an age-specific rule, which targets advertisements associated with particular age-specific types of products or services to the particular customer (e.g., certain types of shoes for customers between the ages of fifteen and eighteen, and other types of shoes for customer between the ages of twenty-one and twenty-five, etc.); (ii) a preference-specific rule that selects advertisements associated with the customer's specified preferences (e.g., as specified within the profile data); or (iii) an application- or game-specific rule, which selects advertisements based on the type of application program or gaming program that integrates the SDK, or a specific video game with which the customer interacts.

In other examples, executed AI engine 130 may select appropriate advertisements for the particular customer based on an application of a trained machine learning (ML) or artificial intelligence (AI) model to a dynamically determined set of input data (e.g., as selected via feature engineering, etc.). Examples of the ML or AI models may include, but are not limited to, a deep neural network and one or more decision tree models, such as a boosted decision tree model. Further, the set of input data may include, but is not limited to: one or more elements of the profile data characterizing the particular customer; one or more elements of the event data; historical interaction data (e.g., as maintained within data warehouse 116) characterizing prior interactions between the particular customer and the marketplace (e.g., data indicating previous activity with the marketplace, such as historical impressions or purchases); application or game data (e.g., rules or requirements game developers configure when adding a game to the marketplace network); and retailer data (e.g., rules or requirements retailers configure when adding a product to the marketplace network). For example, executed AI engine 130 may determine one or more product advertisements for a particular customer based on profile data for that customer, the game data for the game the user is currently playing, and retailer data for a plurality of products.

In some instances, executed recommendation engine 124 may receive requests for the appropriate advertisements from customer computing devices 110A, 110B, and 110C (e.g., as generated by an application program or gaming application integrating the SDK), and may route the received requests to executed AI engine 130, which may perform any of the exemplary processes described herein to select the requested advertisements, and to provide data characterizing these appropriate advertisements (e.g., digital images, digital videos, other elements of digital content, and layout data characterizing a positioning of each of the digital images, digital videos, or other elements of digital content within the GUI, etc.) as a response to executed recommendation engine 124. Further, data characterizing the appropriate advertisements may also be routed to executed event service engine 132, which may store the data within a portion of data warehouse 116 in conjunction with corresponding elements of profile data, e.g., as further information characterizing that customer's interaction with the marketplace.

Further, executed recommendation engine 124 may also transmit the data characterizing the appropriate advertisements across network 118 to a corresponding one of customer computing devices 110A, 110B, or 110C, and the executed application program or gaming application may process the data and present the advertisements within one or more display screens of the marketplace GUI, e.g., within the digital interface associated with the executed application program or gaming application. In some examples, the presented advertisements may facilitate the purchase of the advertised product. For example, a user may engage (e.g., click on, select, etc.) a particular one of the product advertisement, which may cause the executed application program or gaming application (e.g., via the integrated SDK) to add a selected product to an online shopping cart within the executed application program or gaming application. The user may then proceed to purchase the advertised product without ever leaving the environment of the executed application program or gaming application (e.g., the gaming environment of the corresponding game).

When a user purchases a product, the executed application program or gaming application (e.g., via the integrated SDK) may generate and transmit event data characterizing the initiated purchase across network 118 to marketplace platform system 120. In some instances, the API of marketplace platform system 120 may receive the event data, and route the event data to executed event service engine 132 may receive event data identifying and characterizing the purchase. For example, the event data may identify one or more of the user (e.g., login credentials), the game or application program (e.g., a game identification (ID) unique to the game, etc.), the purchased product, the purchase price of the product, and the purchased quantity, along with any selected shipping options. Event service engine 132 may provide this event data to executed commerce services engine 128, which may perform further operations that process and complete the purchase transaction.

For example, executed commerce services engine 128 may perform operations that parse the event data to identify the user (e.g., via the login credentials), and obtain profile data identifying one or more payment instruments available to fund the initiated purchase and shipping information (e.g., an address, etc.) for products purchased through the marketplace. Based on the data identifying the payment instrument, executed commerce services engine 128 may perform operations that generate a payment request that identifies the purchase amount and the payment instrument, and route that payment request to an appropriate payment network or rail (e.g., credit card payment network or debit card payment network) or to a third-party vendor that processes payment (e.g., not illustrated in FIG. 1).

Further, in response to an approval of the payment request, executed commerce services engine 128 may also perform operations that route payment for the purchased product to a corresponding retailer (e.g., the retailer that provided the corresponding product advertisement for the product to the marketplace), either directly or via the third-party vendor described above. Executed commerce services engine 128 may also generate a communication (e.g., email, short message service (SMS) message, etc.) to a device of the corresponding retailer associated with the product (e.g., via retailer computing devices 112A or 112B). The communication may, for example, identify the purchased product, the quantity of the purchase product, the customer name and shipping address, and a confirmation of the approved payment, and upon receipt of the communication, the device of the corresponding retailer may perform operations that complete the purchase and provide the purchased product to the customer.

Additionally, and in further response to an approval of the payment request, executed commerce services engine 128 may perform further operations that allocate marketplace credits to the user based on the purchased products. For example, each advertised product may be associated with a number of marketplace credits. If the user purchases the advertised product, the user is awarded with the number of marketplace credits. In one example, the marketplace credits are cash credits. In other examples, the marketplace credits may be provided as cryptocurrency, which may be utilized on one or more application programs or gaming applications that integrate the SDK and are associated with the marketplace. The user may, for instance, view the marketplace credits associated with the user within the gaming environment, such as within the marketplace GUI presented upon engagement with the marketplace icon.

A user may, in some examples, exchange marketplace credits for in-game points or rewards. For example, a user may initiate an exchange of marketplace credits for in-game points for a particular game, e.g., based on input provided to the marketplace GUI generated and presented at a corresponding one of customer computing devices 110A, 110B, or 110C. Marketplace platform system 120 may receive event data characterizing the requested exchange (e.g., as generated by the application program or gaming application executed at the corresponding one of customer computing devices 110A, 110B, or 110C) via the API, which may route the event data to executed event service engine 132. As described herein, executed event service engine 132 may perform operations that store the received event data within a corresponding portion of data warehouse 116, e.g., in conjunction with the elements of profile data characterizing the user.

Further, the API may also route the received the event data to event commerce services engine 128, which may process the exchange by withdrawing one or more units of marketplace credits from the user's account (e.g., as specified within account data maintained on behalf of the user within data warehouse 166) and by generating a message identifying and characterizing the in-game points to be awarded to the user in exchange for the units of marketplace credits. In some instances, marketplace platform system 120 may transmit the message to a corresponding one of content provider computing devices 114A or 114B, which may process the message and apply the in-game credits for use by the user within the corresponding application program or gaming application (e.g., for in-game purchases within the gaming environment established by the gaming application).

Marketplace dashboard engine 126, when executed by marketplace computing device 102, provides an interface to a marketplace platform, which may be a website hosted by marketplace computing device 102. The marketplace platform may provide an interface to retailer computing devices 112A and 112B, e.g., through which retailers can provide retailer data identifying and characterizing one or more products or services available for purchase within the exemplary marketplace described herein. In some instances, the retailer data may further include requirements (e.g., rules) as to the types of games the products may be advertised within. The marketplace platform further provides an interface to content provider computing devices 114A and 114B, e.g., through which the corresponding content providers, such as game developers, may provide data identifying and characterizing corresponding gaming application and gaming environments. For instance, the elements of gaming data may include information characterizing one or more gaming that integrate the SDK, as well as requirements (e.g., rules) as to which products may be advertised to users of each gaming application. The disclosed embodiments are, however, not limited to gaming applications, and in other instances, content provider computing devices 114A and 114B may provide, through the interface, application data characterizing one or more additional, or alternate, application programs that integrate the SDK, and one or more requirements regarding which products may be advertised within corresponding ones of these application programs.

Executed marketplace dashboard engine 126 may also provide the marketplace platform to administrators of marketplace platform system 120. The marketplace platform may allow administrators to view user data, retailer data, and game data, for example. The marketplace platform may also allow administrators to configure rules used for matching product advertisements to games, or for configuring AI engine 130 (e.g., such as by enabling or disabling machine learning processes, adjusting parameters such as hyper parameters, etc.).

Product management engine 134 may, upon executed by marketplace computing device 102, determine what product advertisements may be displayed within games based on the requirements defined for each product within retailer data and requirements defined for each gaming application within the gaming data (or for each application program within the application data). For each gaming application or application program, product management engine 134 may determine a set of candidate product advertisements that may be displayed. For example, the gaming data may specify that product advertisements for only a particular brand may be displayed with a particular gaming application. As such, executed product management engine 134 may identify all product advertisements associated with that particular brand, and includes the identified product advertisements within a set of candidate product advertisements for that gaming application. The set of candidate product advertisements for each gaming application, and for each application program, may be stored in data warehouse 116, for example. In other examples, the set of candidate product advertisements may be established through an application of one or more of the trained ML or AI models described herein to elements of the retailer data, the gaming data, and/or the application data.

In some examples, executed external services engine 138 may perform operations that facilitate vendor-specific integrations with marketplace platform system 120, such as, but not limited to, integrations with vendor e-commerce systems (e.g., retailer websites or backend systems), shipping systems, external partner services, and external AI services. For example, in some embodiments, rather than matching product advertisements to a user using AI engine 130, external services engine 138 may be operable to communicate with an external AI service that allows for execution of one or more of the trained ML or AI models described herein. In some instances, executed external services engine 138 may generate a message identifying one or more of the user data, the retailer data, and the gaming and/or application data, and may transmits the message to the one or more computing systems associated with the external AI service. In response, the external AI service determines one or more product advertisements, and transmits a message identifying the product advertisements to marketplace platform system 120 via external services engine 138.

In some examples, as described herein, marketplace platform system 120, which includes marketplace computing device 102, instruction memory 140, and data warehouse 116, may correspond to a single, discrete computing system operating within environment 100. In other instances, the functionalities of marketplace platform system 120 may be performed by a combination of discrete computing systems operating within environment 100. Further, in some instances, marketplace platform system 120 may correspond to a distributed system that includes computing components distributed across one or more networks, such as network 118, or other networks, such as those provided or maintained by cloud-service providers (e.g., Google Cloud™, Microsoft Azure™, etc.).

Examples of marketplace computing device 102 of marketplace platform system 120 may include, but are not limited to, a personal computer, a laptop computer, a tablet computer, a notebook computer, a hand-held computer, a personal digital assistant, a mobile phone, a smartphone, a server (e.g., a cloud-based server), and any other type of computing device that may be configured to store data and software instructions and to execute the software instructions to perform operations consistent with disclosed embodiments. Further, examples of customer computing devices 110A, 110B, and 110C may include, but are not limited to, fully-functional desktops computers, handheld or tablet computers, smartphones, or gaming consoles. Further, examples of retailer computing devices 112A and 112B, and content provider computing devices 114A and 114B, may include, but are not limited to, fully-functional desktops computers, handheld or tablet computers, and smartphones.

Figure 2:
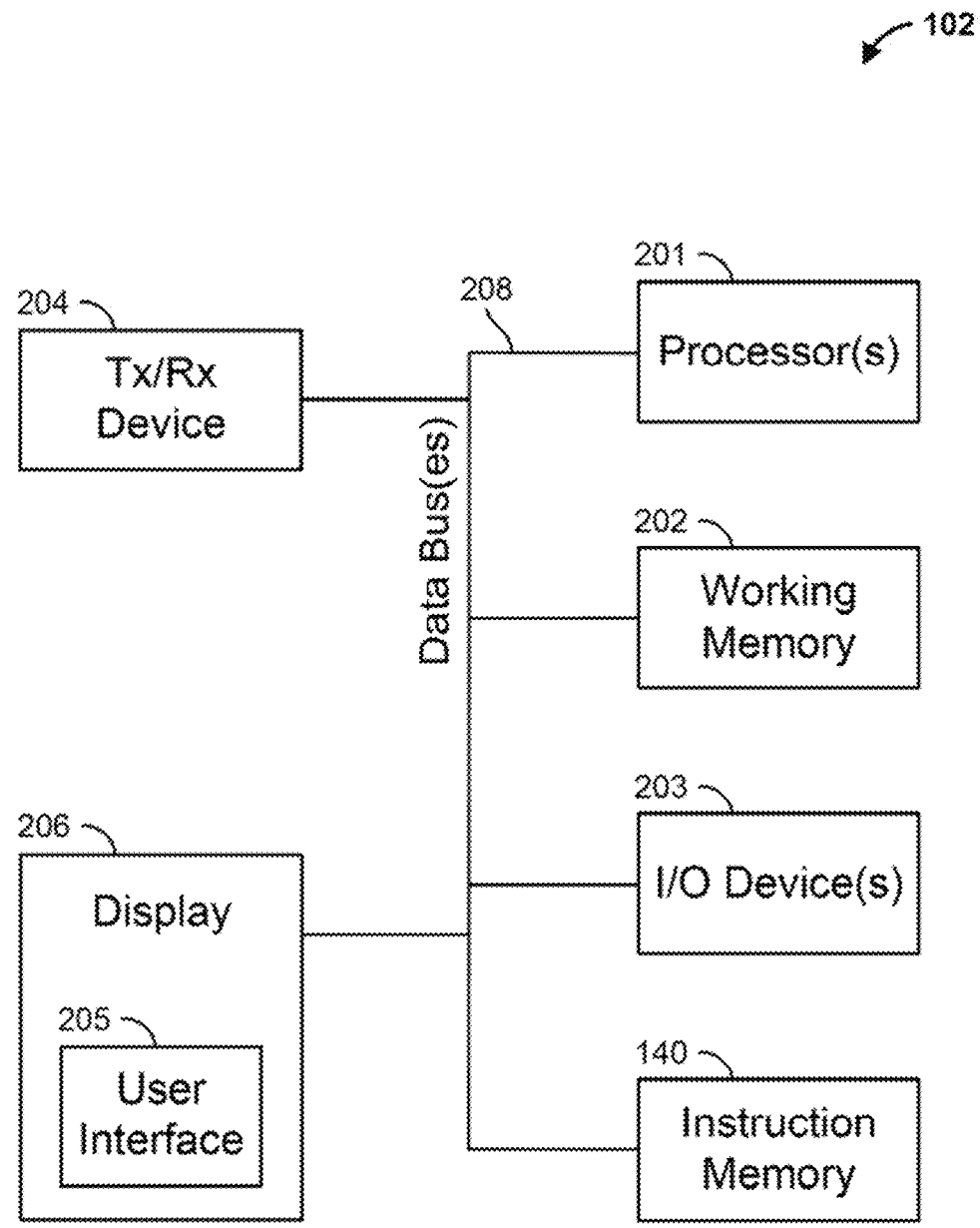
FIG. 2 is a block diagram of an exemplary computing device, in accordance with some embodiments.

FIG. 2 illustrates an exemplary marketplace computing device 102, consistent with certain disclosed embodiments. Further, although not illustrated in FIG. 2, customer computing devices 110A, 110B, and 110C, retailer computing devices 112A and 112B, and content provider computing devices 114A and 114 may include similar hardware components and may perform functionalities similar to those described in reference to marketplace computing device 102.

As illustrated in FIG. 2, marketplace computing device 102 may include one or more processors 201, working memory 202, one or more input/output devices 203, instruction memory 140, a transceiver 204 (e.g., communications unit), and a display 206, all operatively coupled to one or more data buses 208. Data buses 208 allow for communication among the various devices. Data buses 208 may include one or more wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 140 can store instructions that can be accessed (e.g., read) and executed by processors 201. For example, instruction memory 140 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 140, embodying the function or operation. For example, processors 201 can be configured to execute code stored in instruction memory 140 to perform one or more of any of the functions, methods, or operations disclosed herein, such as those described herein with respect to SDK engine 122, recommendation engine 124, marketplace dashboard engine 126, commerce services engine 128, AI engine 130, event service engine 132, product management engine 134, user identity engine 136, and external services engine 138.

Additionally, processors 201 can store data to, and read data from, working memory 202. For example, processors 201 can store a working set of instructions to working memory 202, such as instructions loaded from instruction memory 140. Processors 201 can also use working memory 202 to store dynamic data created during the operation of marketplace computing device 102. Working memory 202 can be a random access memory (RAM) such as a static random access memory (SRAM) or dynamic random access memory (DRAM), or any other suitable memory.

Input/output devices 203 can include any suitable device that allows for data input or output. For example, input/output devices 203 can include one or more of a keyboard, a touchpad, a mouse, a stylus, a touchscreen, a physical button, a speaker, a microphone, or any other suitable input or output device.

Display 206 can display user interface 205. User interface 205 can enable user interaction with marketplace computing device 102. For example, user interface 205 can be a user interface for an application that allows an administrator to configure the marketplace dashboard. In some examples, a user can interact with user interface 205 by engaging input/output devices 203. For example, a user may provide input via input/output devices 203 response to interface elements presented through display 206. In some examples, display 206 can be a touchscreen, where user interface 205 is displayed on the touchscreen.

Transceiver 204 allows for communication with a network, such as the communications network 118 of FIG. 1. For example, if communications network 118 of FIG. 1 is a cellular network, transceiver 204 is configured to allow communications with the cellular network. Processor(s) 201 is operable to receive data from, or send data to, a network, such as communications network 118 of FIG. 1, via transceiver 204.

Figure 3:
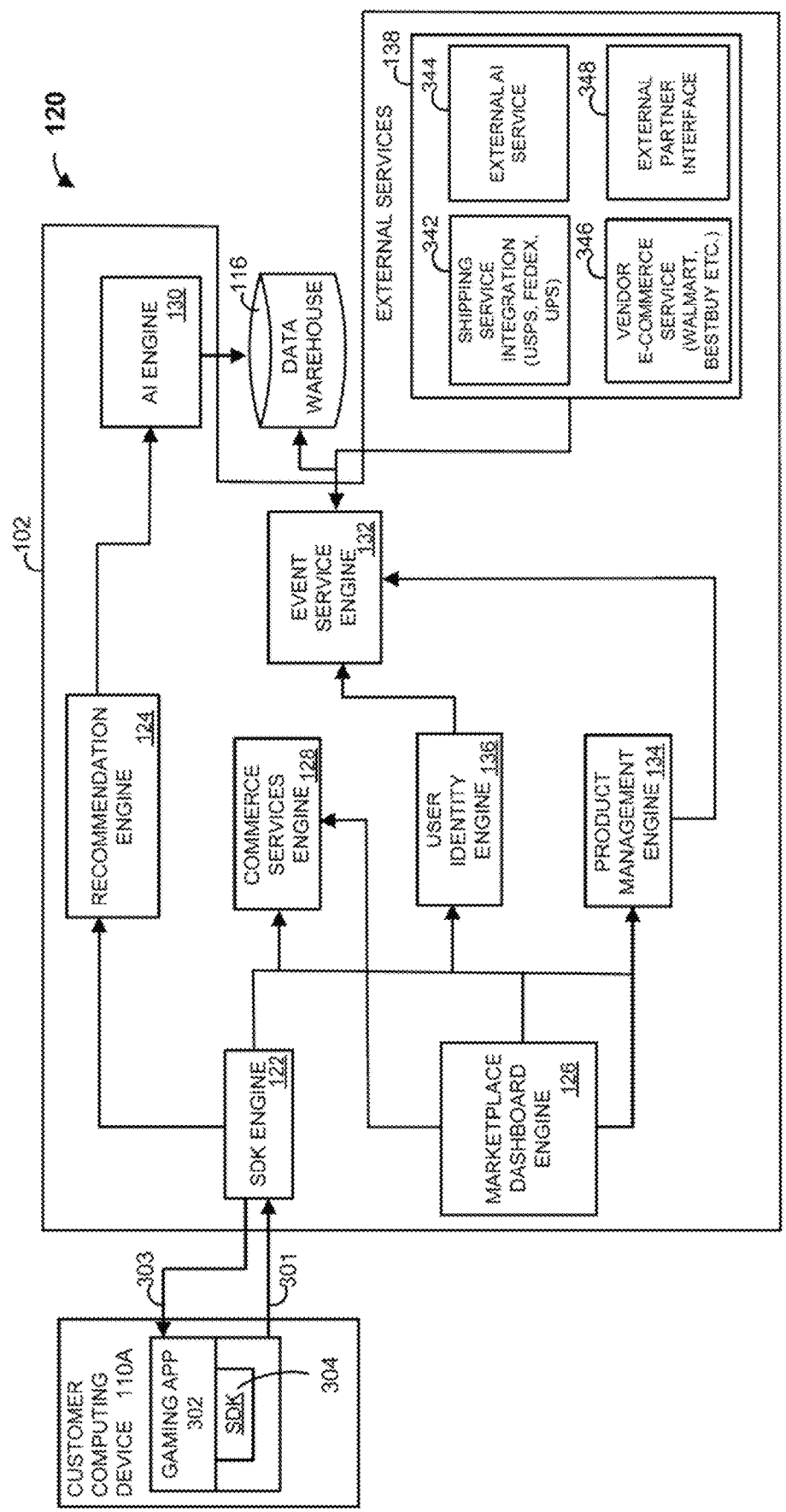
FIG. 3 is a diagram illustrating portions of an exemplary computing environment, in accordance with some embodiments.

FIG. 3 is a diagram illustrating exemplary portions of marketplace platform system 120, consistent with certain disclosed embodiments. As described herein, SDK engine 122 may provide an interface, such as a communication endpoint (e.g., HTTP endpoint) or programmatic interface (e.g., an application programming interface (API)) through which executed application programs or executed gaming applications that integrate the SDK may exchange data with marketplace platform system 120 and as such, with the exemplary electronic marketplace platform described herein.

As illustrated in FIG. 3, customer computing device 110A may executed a gaming application 302, which integrates an SDK associated with and provisioned by marketplace platform system 120, such as SDK 304. In some instances, executed SDK engine 122 may perform any of the exemplary processes described herein to provision elements of digital content (e.g., icons, interface elements, visual components) to executed gaming application 302 that are suitable for display within the context of the gaming environment provided by executed gaming application 302. For example, the provisioned elements of digital content may represent portions of the gaming environment itself, e.g., as a portion of streaming gaming environment. In other examples, the elements of digital content may facilitate the presentation of one or more dynamically selected advertisements as part of a marketplace GUI within an ongoing gaming environment.

Additionally, SDK engine 122 may receive certain elements of event data 301 from executed gaming application 302, and may perform operations that parse the received elements of event data 301 for further distribution to other software engines executed by marketplace platform system 120, such as those described above in reference to FIG. 1. For example, executed SDK engine 122 may route event data 301 to executed user identity engine 136, which may perform any of the exemplary processes described herein to authenticate an identity of a corresponding user based on copies of locally stored login and authentication credentials (e.g., as maintained within data warehouse 116), and additionally, or alternatively, when a marketplace account does not exist exists for the user, provide additional data to executed gaming application 302 that, when presented to the user, prompts the user to create a marketplace account.

Further, and responsive to a successful user authentication, SDK engine 122 may obtain from executed recommendation engine 124 product advertisements appropriate for display to the now-authenticated user within the gaming environment established by executed gaming application 302. For example, event data 301 may include a request for advertising content, and as described herein, executed recommendation engine 124 may generate and transmit programmatic instructions to executed AI engine 130, which may cause executed AI engine 130 to perform any of the exemplary processes described herein to select product advertisements appropriate to the user and the gaming environment.

For example, and as described herein, executed AI engine 130 may select appropriate advertisements for the particular customer based on an application of a trained ML or AI model to a dynamically determined set of input data (e.g., as selected via feature engineering, etc.). Examples of the ML or AI models may include, but are not limited to, a deep neural network and one or more decision tree models, such as a boosted decision tree model. Further, the set of input data may include, but is not limited to: one or more elements of the profile data characterizing the user, one or more elements of event data 301, historical interaction data (e.g., as maintained within data warehouse 116) characterizing prior interactions between the user and the marketplace (e.g., data indicating previous activity with the marketplace, such as historical impressions or purchases), gaming data (e.g., rules or requirements game developers configure when adding a game to the marketplace network), and retailer data (e.g., rules or requirements retailers configure when adding a product to the marketplace network). Executed recommendation engine 124 may receive the selected advertisements from executed AI engine 130, and may provide data 303 that characterizes the selected advertisements to SDK engine 122 for transmission (e.g., via transceiver 204) to customer computing device 110A. In some instances, executed gaming application 302 may process and ingest data 302, and may perform any of the exemplary processes described herein to present the selected advertisements to the user within the gaming environment, e.g., on one or more display screens of the marketplace GUI upon selection of the marketplace icon.

In some examples, AI engine 130 trains the one or more machine learning processes with training data (e.g., unsupervised training data), which may include historical user data, historical retailer data, and historical game data. For example, AI engine 130 may train the one or more machine learning processes with training data covering a first period of time (e.g., 12 months, 16 months). Once trained, the one or more machine learning processes may be validated (e.g., tested) with validation data covering a second period of time (e.g., 2 months, 4 months). The one or more machine learning processes may be refined during the validation. Once validated, the one or more machine learning processes may made available for use to determine product advertisements for users.

In some examples, executed recommendation engine 124 and executed AI engine 130 may perform any of the exemplary processes described herein to select advertising content appropriate to the user and to the gaming environment on accordance with a predetermined schedule (e.g., nightly, weekly, monthly, or at specified dates, which may be configurable and stored within data warehouse 116), or in response to a detection of a specific triggering event. Executed recommendation engine 124 may, for example, store data identifying and characterizing the selected advertisements and advertising content for each registered user of marketplace platform system 120 (e.g., for each user having a registered account) within data warehouse 116, e.g., in conjunction with corresponding elements of profile data. When a request for advertising content appropriate to a particular user and/or gaming environment is received from SDK engine 122, executed recommendation engine 124 may access data warehouse 116 and obtain all or a selected subset of the stored advertisements and advertising content associated with that particular user, and transmit data 303 that includes the obtained advertisements or advertising content to SDK engine 122, e.g., for transmission (e.g., via transceiver 204) to customer computing device 110A.

In other instances, event data 301 may also identify and characterize user activity related to the marketplace within the gaming environment. Examples of this marketplace activity include, for example, activating the marketplace interface (e.g., by engaging a marketplace icon), viewing a particular product (e.g., an impression), purchasing a product, logging in to the marketplace, logging out of the marketplace, and progress made by the user in game play. Based on the marketplace activity, SDK engine 122 may provide event data 301 to event service engine 132, which may log the receipt of event data 301 within a corresponding event log (e.g., maintained within data warehouse 116), and may store event data 301 within a portion of data warehouse 116, e.g., in conjunction with corresponding elements of profile data characterizing that user. As described herein, AI engine 130 may then obtain all or a portion of event data 301 from data warehouse 166, e.g., for input into the adaptively trained ML and AI models described herein.

In some instances, product management engine 134 may filter out ineligible products from being advertised within a particular gaming environment, e.g., as established by executed gaming application 302. For example, event service engine 132 may receive event data 301 identifying a request for advertisements appropriate to a particular user of executed gaming application 302. In response to a request from event service engine 132, product management engine 134 may perform any of the exemplary processes described herein to identify a set of candidate product advertisements appropriate to the user and the gaming environment based on based on requirements set forth within locally maintained elements of retailer data, e.g., as maintained within data warehouse 116. For example, product management engine 134 may include a product advertisement in the set of candidate product advertisements if none of the rules would be violated if the product advertisement were to be displayed within the game. Product management engine 134 may provide the set of candidate product advertisements for each game to event service engine 132 for storage into data warehouse 116.

In additional examples, product management engine 134 may, in accordance with a predetermined schedule (e.g., nightly, weekly, monthly, etc.), perform any of these exemplary processes described herein to generate a set of candidate product advertisements for gaming application 302 and other gaming applications that integrate the SDK (and further, for any additional or alternate application programs that integrate the SDK), and to stores the generated sets of candidate product advertisements in data warehouse 116. Event service engine 132 may then obtain the set of candidate product advertisements for a particular gaming environment, such as that established by gaming application 302, from data warehouse 116. Additionally, in some examples, and when selecting product advertisements appropriate to a user and a gaming environment (e.g., the user interacting with executed gaming application 302, etc.), AI engine 130 may operate on the corresponding set of candidate product advertisements for that gaming environment and user, which excludes product advertisements outside of that candidate set from display to user within the gaming environment.

As described herein, marketplace dashboard engine 126 may perform operations that provide an interface, such as a webpage, to the marketplace platform. The provisioned interface may, for example, allow retailers, via retailer computing devices 112A and 112B, to provide retailer data to marketplace platform system 120, and examples of the retailer data include, but are not limited to, information about a product, such as a product description, product options (e.g., colors), product features, and/or a product price. The retailer data may further include requirements as to the types (e.g., categories) of games within which each of the identified products may be advertised.

Further, the retailer data may also identify one or more rewards provisionable to the user in response to a purchase of a particular product. The reward may be a monetary award (e.g., a cash back reward) or an award of a specified number of units of cryptocurrency or marketplace credits, for the user making the purchase. In some examples, marketplace dashboard engine 126 may provide the reward to commerce services engine 128 and, in response, commerce services engine 128 determines a corresponding number of marketplace credits to award to the user. For example, the number of marketplace credits may have a value equal to the reward based on a predetermined conversion ratio (e.g., 1000 marketplace credits for each reward dollar). Commerce services engine 128 may update user data for the user stored in data warehouse 116 with the marketplace credits, which as described herein the user may exchange for in-game rewards or credits of any game part of the marketplace network (e.g., from within the game environment of any game).

The provisioned interface may also allow content providers, such as game developers via content provider computing devices 114A, 114B, to provide gaming data to marketplace platform system 120. Examples of the gaming data may include information about the gaming application that integrate the SDK, such as game ratings (e.g., age ratings, violence ratings, etc.), and, in some examples, requirements as to which products may be advertised to users of each game. For example, a content provider may specify that products of a particular category (e.g., grocery items) not be advertised to users of a particular gaming application. Marketplace dashboard engine 126 may store the received retailer data and gaming data within data warehouse 116.

In some examples, marketplace dashboard engine 126 may also perform operations that generate analytical information characterizing the products or services offered for sale through the exemplary marketplace GUI described herein, and that display the generated analytical information within the interfaces provisioned to retailer computing devices 112A and 112B and/or to content provider computing devices 114A and 114B. For example, marketplace dashboard engine 126 may aggregate and display products sold, total purchase amounts, times of sales, campaign performance measures, promotion engagement by users (e.g., a percentage of users that accept the promotion), conversions to buy (e.g., a percentage of users that buy the product after clicking on the product advertisement), and demographic information of the purchasers sold through all games. In some examples, marketplace dashboard engine 126 may provide similar information, but on a per game basis (e.g., for each game).

External services engine 138 may perform operations that facilitate vendor-specific integration of external services with marketplace platform system 120. In some examples, external services engine 138 includes shipping service integration module 342, external AI services module 344, vendor e-commerce service module 346, and external partner interface module 348. Further, each of shipping service integration module 342, external AI services module 344, vendor e-commerce service module 346, and external partner interface module 348 may, upon execution, establish a secure, programmatic channel of communications with one or more devices or computing systems of respective external services. Event service engine 132 may communicate with external services engine 138 to facilitate and support the integration, access, and provisioning of these external services.

For example, external AI services module 344 may establish a programmatic interface to a computing system of a third-party vendor that provides ML or AI services, such as ML models that may be employed by AI engine 130. In some examples, external services engine 138 may perform operations that, via the programmatic communications channel established by external AI services module 344, obtain one or more ML models, such as deep neural network algorithms or boosted decision tree algorithms, and store the obtained ML models in data warehouse 116. AI engine 130 may then obtain the machine learning models from data warehouse 116, and train, or execute, the machine learning models, e.g., using any of the exemplary processes described herein.

In some examples, event service engine 132 may, based on interaction with shipping service integration module 342, obtain data identifying and characterizing shipping options and corresponding costs for shipping products purchased the user of executed gaming application 302 using any of the exemplary processes described herein. For example, event service engine 132 may provide shipping request data corresponding to a product to shipping service integration module 342 and, in response, obtain one or more shipping options for the product from one or more computing systems associated with various shipping services, such as Federal Express™ or UPS™. The shipping request data may identify a product, an origin address, a destination address, and a weight of the product, for example.

In some examples, and as described further herein, a retailer may configure a shipping setting within the marketplace platform (as facilitated by marketplace dashboard engine 126) that enables the obtaining of shipping costs for a product. When enabled, event service engine 132 may automatically obtain shipping costs from shipping service integration module 342 when a product advertisement for the product is to be displayed to a user. For example, recommendation engine 124 may select a product advertisement appropriate for display to a user of executed gaming application 302, and assuming the shipping setting is enabled, event service engine 132 may obtain an address for the user from user data stored within data warehouse 116, and may generate shipping data that includes the address as the destination address, as well as an origin address of the retailer and a weight of the product, each of which may be stored within retailer data in data warehouse 116. Event service engine 132 may provide the shipping data to shipping service integration module 342 and, in response, obtain shipping response data identifying one or more shipping options. For example, the shipping response data may identify a first cost for shipping the product with a first carrier, and a second cost for shipping the product with a second carrier. In some examples, the shipping response data further identifies an estimated day of delivery.

Vendor e-commerce service module 346 may provide secure, programmatic channels of communication to respective vendors, such as retailer websites, and external partner interface module 348 may similarly provide secure, programmatic channels of channels to computing systems or devices associated with other partners or third-party services. In some instances, vendor e-commerce service module 346 may obtain, from external computing systems via the programmatic communications channels, product descriptions and product pricing for product advertisements determined by recommendation engine 124.

For example, rather than a retailer configuring a price for a product within the marketplace platform (as facilitated by marketplace dashboard engine 126), the retailer may configure the marketplace platform to obtain product data, such as the product description and price, from the retailer's website. In some instances, event service engine 132 may submit a request to external services engine 138 to obtain the product data and, in response, external services engine parses the request, generates a request message in conformance with a pre-established protocol of communication with vendor e-commerce service module 346, and transmits the request message via vendor e-commerce service module 346 to one or more computing external systems. External services engine 138 may then obtain from vendor e-commerce service module 346 a response message that identifies the requested product data, such as a product description and price. External services engine 138 parses the response message, and provides the product data to event service engine 132 for inclusion, for example, into a product advertisement to be displayed to the user of executed gaming application 302.

Figure 4A:
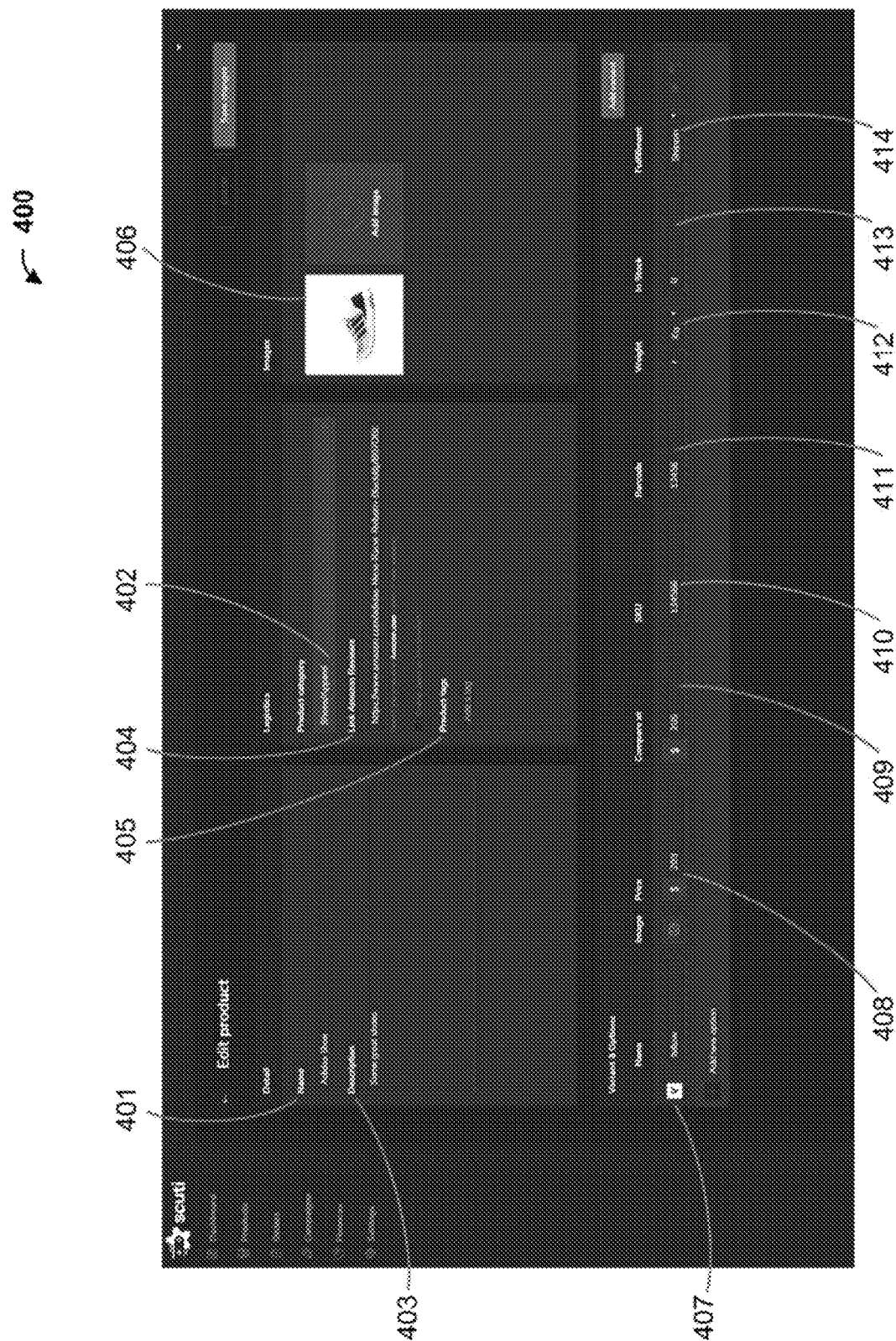
FIGS. 4A, 4B, 4C, 4D, 4E, 4F, 4G, and 4H illustrate portions of an exemplary graphical user interface, in accordance with some embodiments.
Figure 4B:
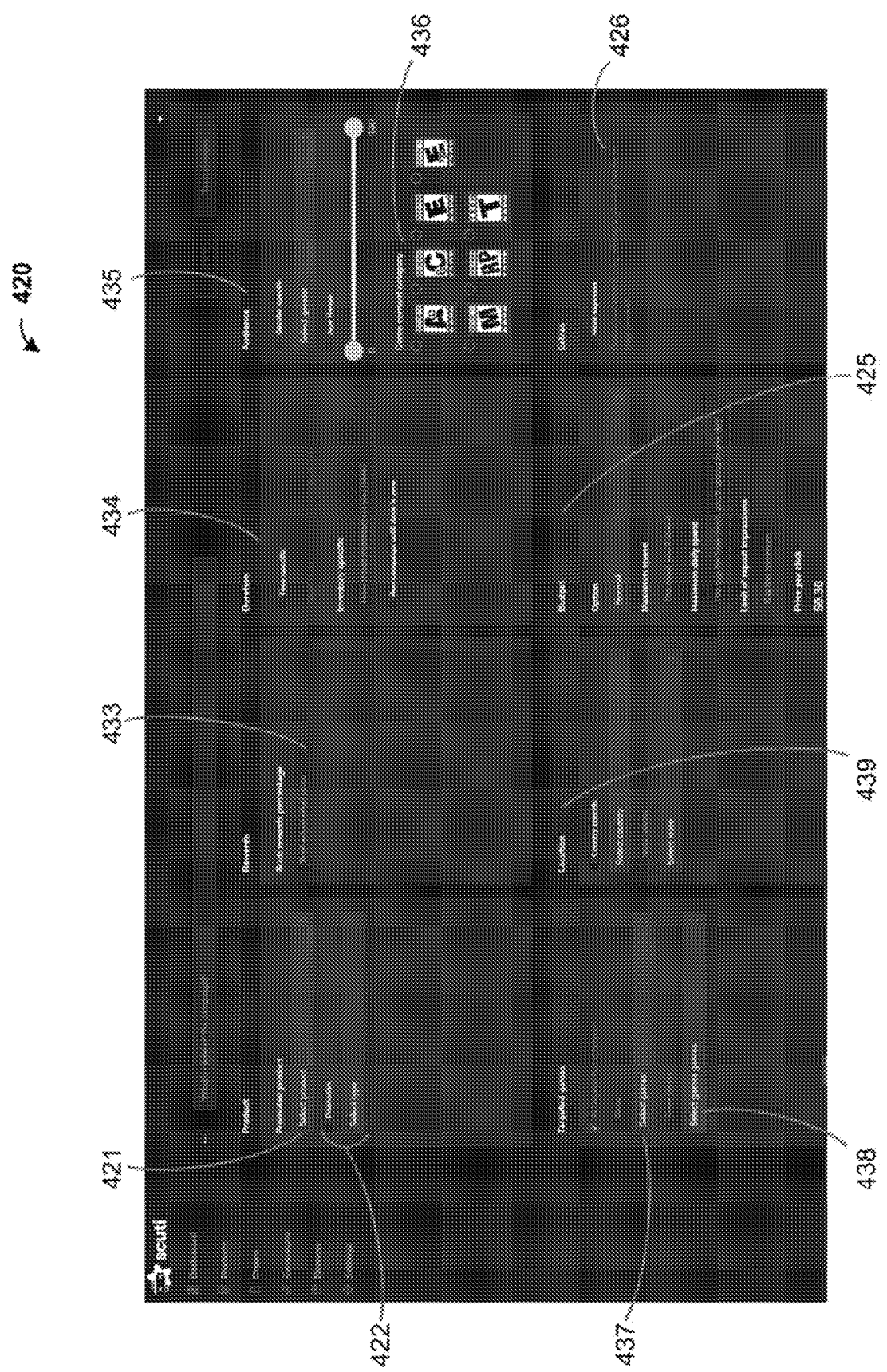

FIGS. 4A and 4B illustrate respective ones of exemplary graphical user interfaces (GUIs) 400 and 420, consistent with certain disclosed embodiments. In some instances, each of GUIs 400 and 420 may correspond to a web page accessible at one or more of retailer computing devices 112A or 112B via an executed web browser.

GUI 400 may include interface elements that enable a retailer to modify (e.g., add, delete, etc.) a list of products available for inclusion within advertisements targeted to users of a gaming application or application program by marketplace platform system 120. As illustrated in FIG. 4A, the interface elements of GUI 400 allow for the entry of a product name 401, product description 403, product category 402, a hyperlink to product reviews 404, product tags 405 (e.g., attributes), and one or more product images 406. GUI 400 also includes interface elements to allow the retailer to provide option data 407 (e.g., color information) for the product, as well as a product price 408, a comparison price 409, a product identifier 410 (e.g., SKU number), a barcode number 411, and a product weight 412 (e.g., to automatically determine shipping costs, as described herein). Further, GUI 400 includes interface elements to allow the retailer to provide an inventory amount 413 (e.g., a number of products available for sale for this product advertisement) and fulfillment data 414 (e.g., shipping, on back order, etc.).

Referring to FIG. 4B, GUI 420 may include interface elements that prompt a retailer to associate products (e.g., such as products added via GUI 400) to a particular advertising campaign, and to provide reward information and requirement data for the associated products. The requirement data may, for example, include requirements (e.g., rules) as to which games the product advertisement may be provided to (e.g., as determined by product management engine 134). As illustrated in FIG. 4B, GUI 420 provides interface elements to allow a retailer to select the product 421 (e.g., by the product name 401 specified in GUI 400), and to assign a promotion 422 to the product. The retailer may further specify a reward amount 433, which may be based on a percentage of the sales price of the product. In some examples, commerce services engine 128 converts the amount of the reward to marketplace credits based on a predetermined convergence ratio. The retailer may further specify duration data 434 for the campaign, which may be based on a specific period of time, or based on inventory.

GUI 420 may also include interface elements that prompt the retailer to provide requirement data. For example, the retailer may specify requirements for the audience 435 (e.g., the gamers) that may view the product advertisements, such as requirements based on gender and age. The retailer may further specify allowable game content categories 436. For example, games not rated according to one of the selected game content categories may not present the product advertisements to its users.

Further, GUI 420 may include interface elements that allow a retailer to identify one or more games 437 or game genres 438 permitted to display the product advertisement, and further interface elements to prompt the retailer to specify geographic requirements associated with the presentation of the product advertisement, such as country and/or state requirements. The geographic requirements may, for example, identify a geographic region where a user must be playing the game for the product advertisement to be displayed to the user. Through these exemplary processes and GUIs, a retailer may provide varying product advertisements for a same product (e.g., differing prices), where a product advertisement may be displayed to a particular user of the game based on where the user is located (e.g., state-specific advertisements).

GUI 420 also provides interface elements that prompt the retailer to specify budget data 424 (e.g., costs to the retailer) associated with the provisioning of product advertisement to users within a particular gaming environment or within a particular application program. For example, the retailer may specify an upper limit the amount of spend on the product advertisement across the entire campaign or on a daily basis (e.g., a max of $100 per day, for a maximum overall cost of $10,000), and may also characterize the upper limit based on a price per impression (e.g., cost per view) and/or a price per click (e.g., cost per click). GUI 420 also allows the retailer to specify the maximum number of times the product advertisement may be shown to the same user (e.g., maximum impressions). In some examples, GUI 420 provides one or more advertisement options 426 for the retailer to enhance the product advertisement (e.g., such as by adding a glowing boarder to the product advertisement).

Figure 4C:
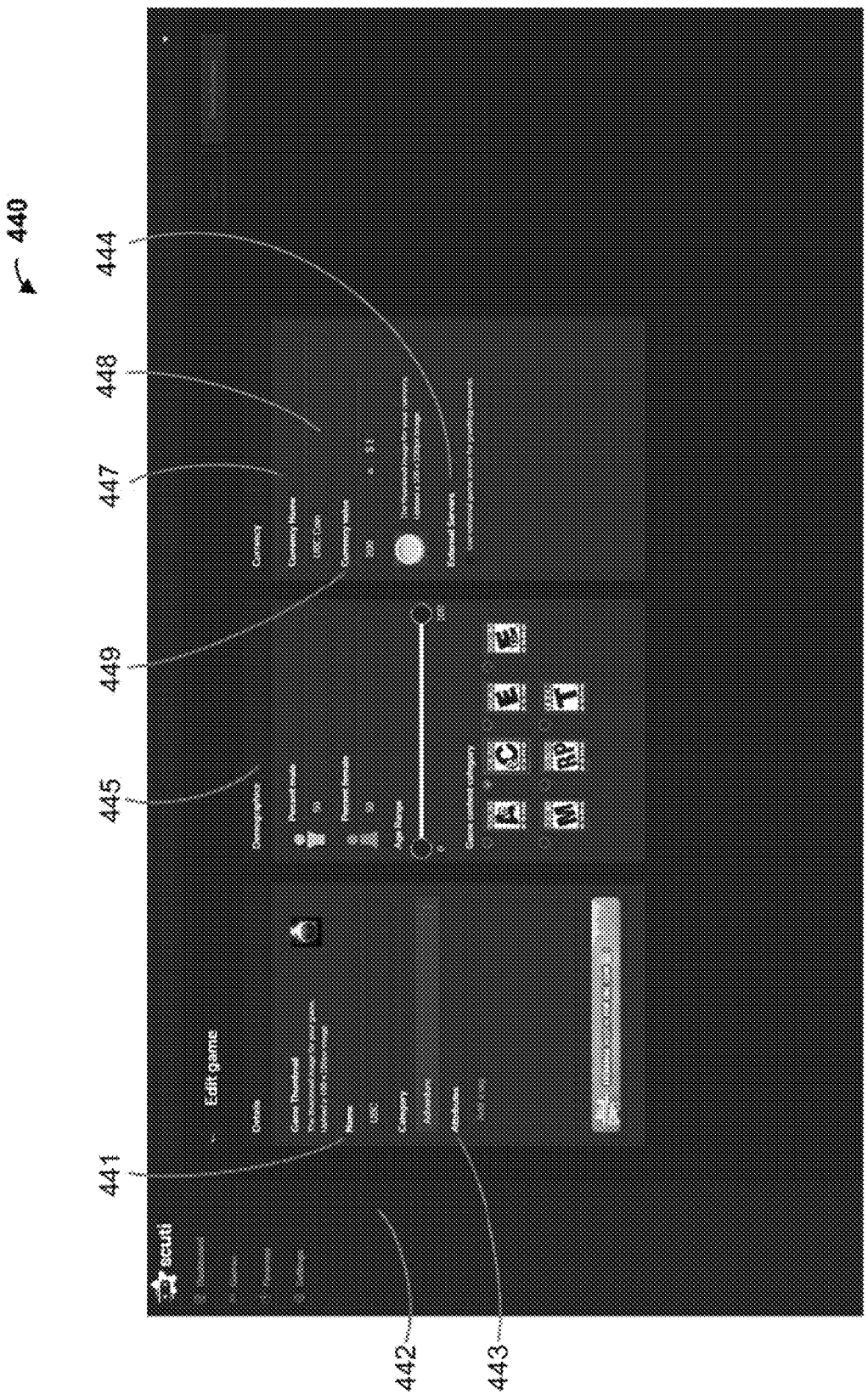

FIG. 4C illustrates an exemplary graphical user interface (GUI) 440, consistent with certain disclosed embodiments. In some instances, GUI 440 may correspond to a web page accessible at one or more of content provider computing devices 114A or 114B via an executed web browser. As illustrated in FIG. 4C, GUI 440 includes interface elements that prompt a content provider, such as a game developer, to provide information about one or more gaming applications (or other application programs) that integrate the exemplary SDK described herein.

In some instances, via GUI 440, the content provider to either add a gaming application to the marketplace network, or edit information about a gaming application already in the marketplace network. For example, GUI 440 may allow the content provider to specify details such as a game name 441, a category 442 of the gaming application, and tags 443 for the game and gaming application. GUI 440 may also prompt the content provider to specify demographics information 445 for users of the gaming application, such as the percentage of males and females that pay the game and an age range for the users, as well as a game rating.

Further, GUI 440 may prompt the content provider to provide game currency information 447 for the gaming application, which may include a currency name 448 and a currency value 449. As described herein, a user may wish to convert marketplace credits for in-game credits (via the SDK integrated into the gaming application). When the user wishes to convert marketplace credits for in-game credits of a game, the user may provide a number of (or value of) the marketplace credits to be converted as inputs to executed gaming application 302 of customer computing device 110, which may transmit a message to marketplace computing device 102 requesting the conversion. Marketplace platform system 120 may (e.g., via commerce services engine 128) determine the conversion of marketplace credits to the in-game currency based on the currency value 449, which may specify an exchange ratio of marketplace credits to in-game credits.

For example, assume the user of gaming application 302 requests to exchange 10,000 marketplace credits for in-game credits. Also assume that 1,000 marketplace credits are equivalent to one dollar, and currency value 449 identifies 200 in-game credits are equivalent to one dollar. Marketplace platform system 120 may determine that the user is to be credited with 2000 in-game credits (e.g., (10,000/1000) *200), and may deduct the number of marketplace credits from the user's account (e.g., based on account data maintained within data warehouse 116). Marketplace platform system 120 may generate and transmit a response to executed gaming application 302 that identifies the in-game credits to be awarded to the user, and executed gaming application 302 may credits the user with the in-game credits, e.g., within the established gaming environment. As an alternative, GUI 440 allows a content provider to identify (e.g., via IP address, or HTTP address) an external server 444 to grant in-game rewards to a user.

FIGS. 4D-4H are diagrams of illustrating respective ones of exemplary graphical user interfaces (GUIs) 450, 460, 470, 480, and 490, consistent with certain disclosed embodiments. In some instances, each of GUIs 450, 460, 470, 480, and 490 may correspond to one or more display screen of a marketplace interface or GUI rendered for presentation within a gaming environment, such as that established by executed gaming application 302, in response to user input provided to customer computing device 110A. Further, and as described herein, the each of GUIs 450, 460, 470, 480, and 490 may accessible to the user within the gaming environment, and may obscure all, or a selected portion of, the digital content presented within that gaming environment by executed gaming application 302.

Figure 4D:

Referring to FIG. 4D, GUI 450 includes multiple product advertisements 452A, 452B, 452C, 452D, 452E, 452F, 452G. For example, one or more of product advertisements 452A-452E may include one or more of a product image 453, a product price 455, and a product review 454. GUI 450 also displays marketplace credit award 466 that are credited to the user, and may further include an online shopping cart icon 457 that, if selected by the user (e.g., based on input provided to customer computing device 110A), displays an online shopping cart that facilitates the purchase of products.

GUI 450 may also include a category filter that allows a user to select, or filter out, a category of products. For example, GUI 450 may allow a user to select one or more product categories (e.g., electronics, clothing, shoes, grocery items, etc.) and, in response, may cause the executed gaming application 302 to generate and transmit a request to marketplace platform system 120 (e.g., via SDK engine 122) for product advertisements associated with products that match the selected product categories. Marketplace platform system 120 may perform any of the exemplary processes described herein to: filter candidate product advertisements appropriate to the user and to gaming application 302 in accordance with the selected product categories; and to transmit the filtered product advertisements to executed gaming application 302, e.g., for display within GUI 450.

Figure 4E:
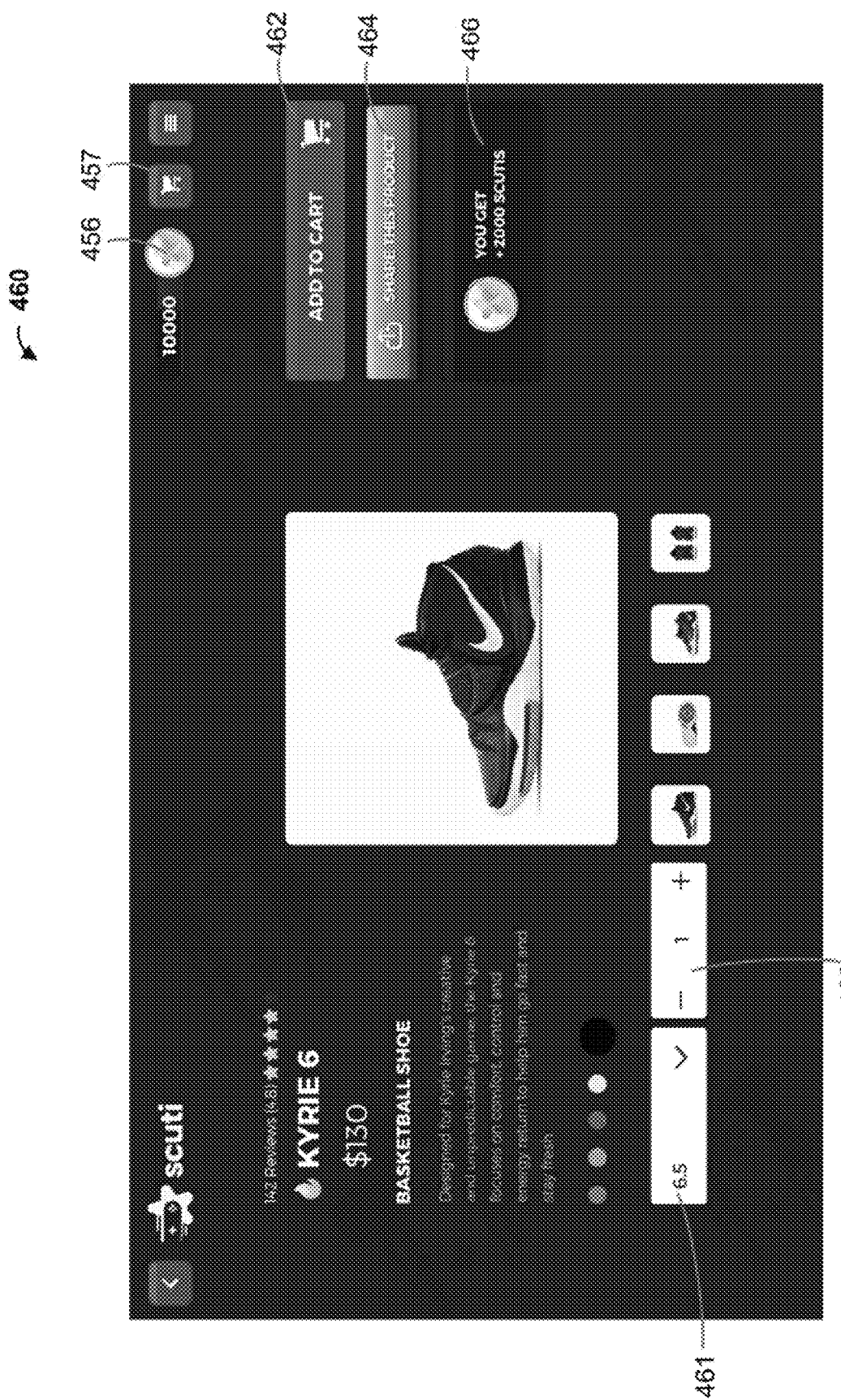

In some examples, the user may provide input to customer computing device 110A that selects product advertisement 452, which causes executed gaming application 302 to present an additional GUI, such as GUI 460 of FIG. 4E, that includes additional details of the selected product, such further product description, images, or options. Referring to FIG. 4E, GUI 460 includes an add-to-cart icon 462, and a share icon 464, as well as a marketplace credit award 466 that is credited to the user if the user purchases the product. GUI 460 also presents interface elements that allow the user to select options for the product. In this example, advertising GUI 460 includes a selectable size 461, and a selectable quantity 463, for the product.

In some instances, the user may elect to purchase the product presented, identified, and characterized by GUI 460, and the user provide additional input to customer computing device 110 that selects add-to-cart icon 462 to add the product to the user's online shopping cart. The user may also provide input to customer computing device 110 selecting online shopping cart icon 457, which indicates the user's desire to view the contents of the online shopping cart. Based on the additional provided input, executed gaming application 302 may perform operations that generate and present an additional GUI, such as GUI 470 of FIG. 4F, that identifies and characterizes those products or services in the user's online shopping cart.

Figure 4F:
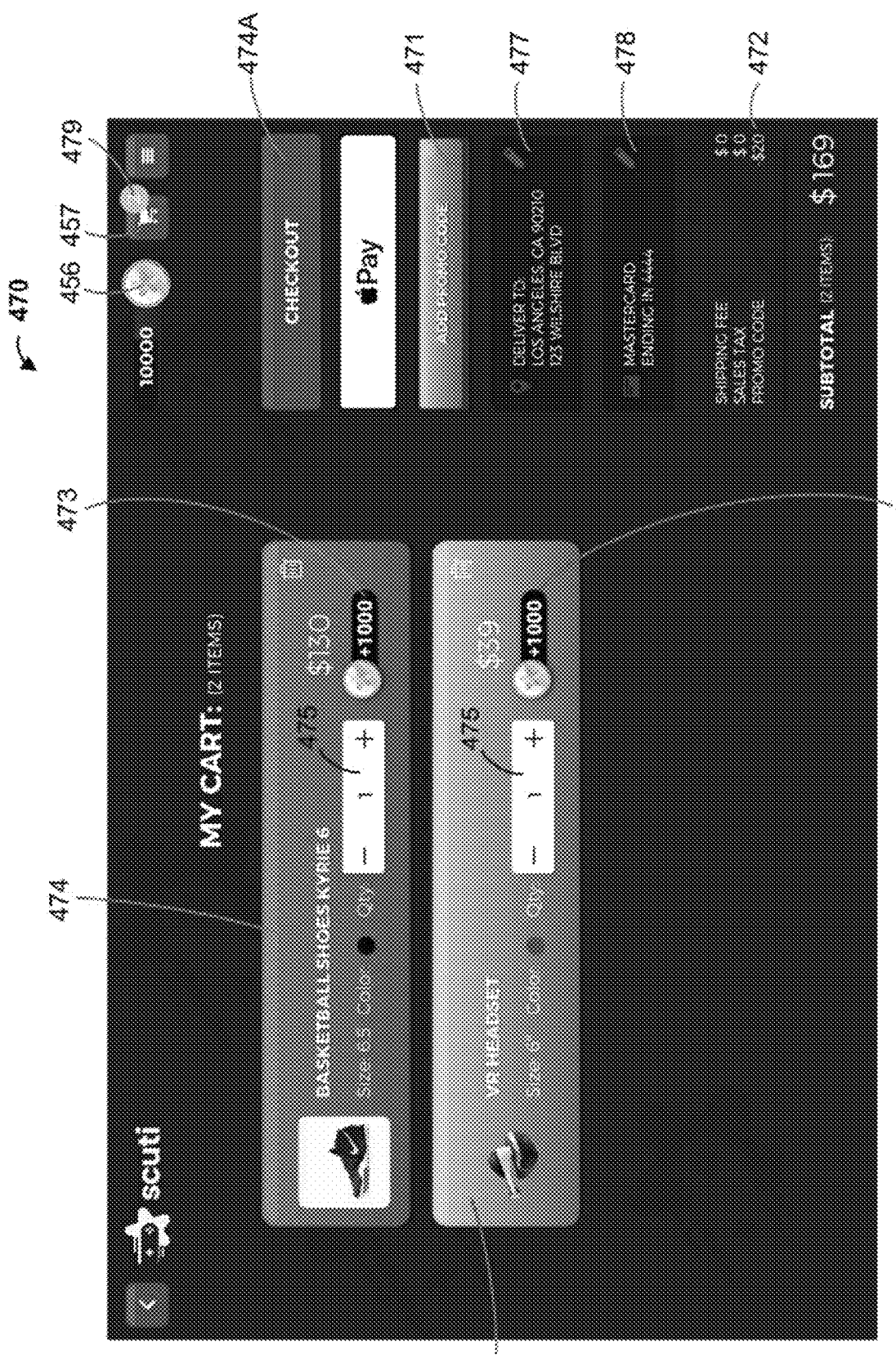

Referring to FIG. 4F, GUI 470 specifies that the user's online shopping cart includes a first item 474 (e.g., the product identified within GUI 460 of FIG. 4E) and a second item 476. The user may, for example, provide further input to customer computing device 110A that adjusts a quantity 475 of each item within GUI 470. Further, each of first item 474 and second item 476 may be further associated with marketplace credits 473, and GUI 470 also includes interface elements allowing the user to specify a shipping address (e.g., destination address) 477, billing information 478 (e.g., credit card number, debit card number), a promotion icon 471, and a checkout icon 474A.

If selected by the user (e.g., based on further input provided to customer computing device 110A), promotion icon 471 allows the user to enter a promotion value (e.g., code) that, if accepted and verified (e.g., by the game and/or marketplace platform system 120), applies a discount 472 to the purchase amount. Checkout icon 474A facilitates purchase of the items 474 and/or 476 in the online shopping cart. For example, upon receipt of additional user input selecting checkout icon 474A, executed gaming application 302 may transmit data identifying one or more of purchased items 474 and/or 476, the quantity 475 of each item, the shipping address 477, the billing information 478, and the marketplace credits 473 associated with each purchased item.

In some examples, an indicator 479 may be overlaid over online shopping cart icon 457 indicating how many products are currently held within the online shopping cart, as illustrated in FIG. 4F. The color of indicator 479 may enable the user to visually differentiate indicator 479 from shopping cart icon 457 and to visually perceive the number of items in the online shopping cart.

Figure 4G:
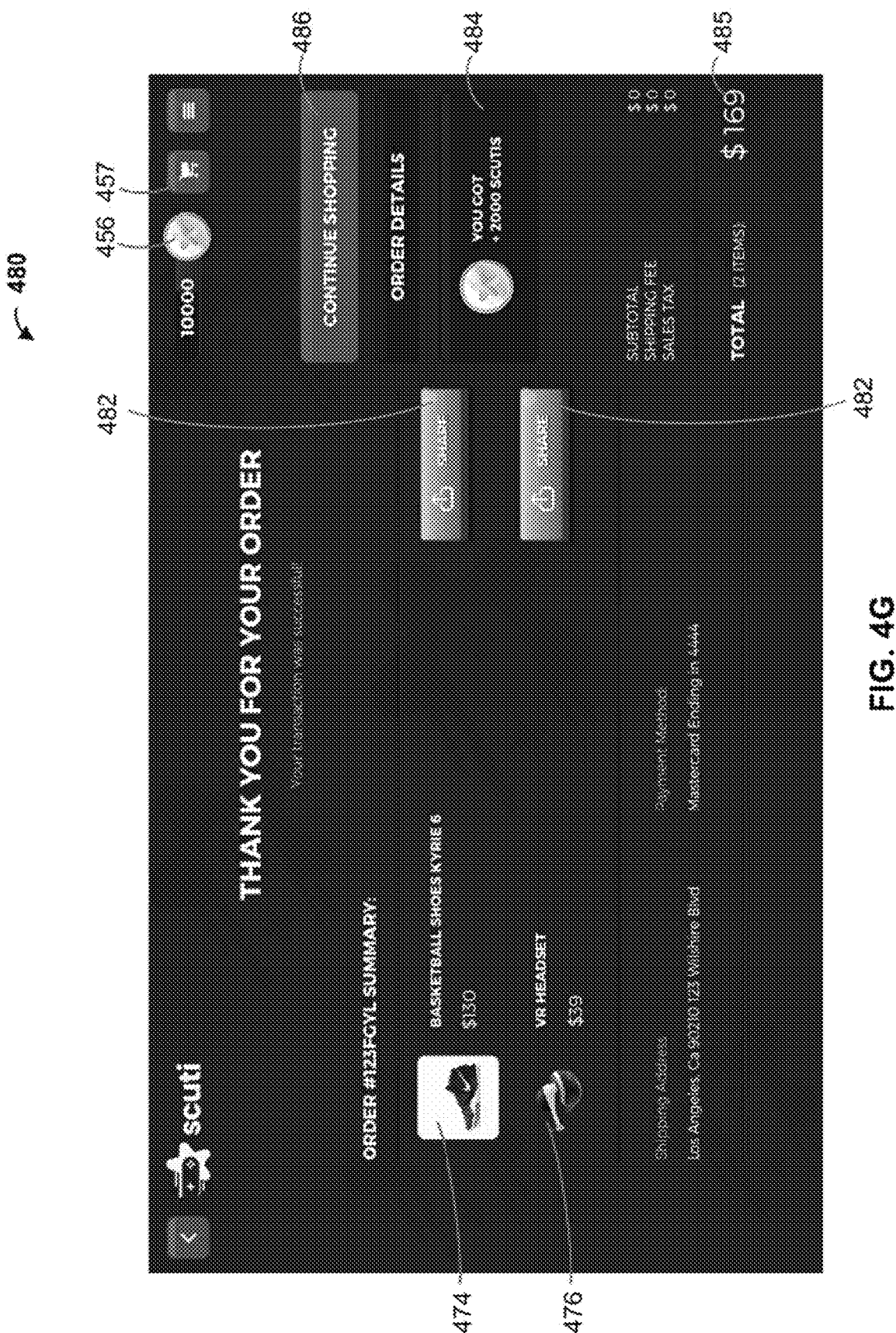

In some instances, and in response to the user completing the purchase order, executed gaming application 302 may perform operations that generate an additional GUI, such as GUI 480 of FIG. 4G, that presents information identifying and characterizing the now-completed purchase order. Referring to FIG. 4G, GUI 480 may include interface elements that identify purchased items 474 and/or 476, and may include a share icon 482 for each purchased item, which facilitates the generation and dissemination of the product advertisement to others (e.g., via social media, email, SMS, etc.). GUI 480 also includes a total purchase amount 485, and a continue shopping icon 486 that, if selected by the user using any of the exemplary processes described herein, causes executed gaming application 302 to present an additional GUI, such as GUI 450 of FIG. 4D, that include additional product advertisements within the marketplace.

GUI 480 may also include a marketplace credit summary icon 484 identifying a number of marketplace credits awarded to the user in response to the purchase. In some examples, the user may provide additional input to customer computing device 110A that selects redemption icon 456, and based on the additional input, executed gaming application 302 may perform operations that generate an additional GUI, such as GUI 490 of FIG. 4H, that includes interface elements prompting the user to redeem one or more units of marketplace credits.

Figure 4H:
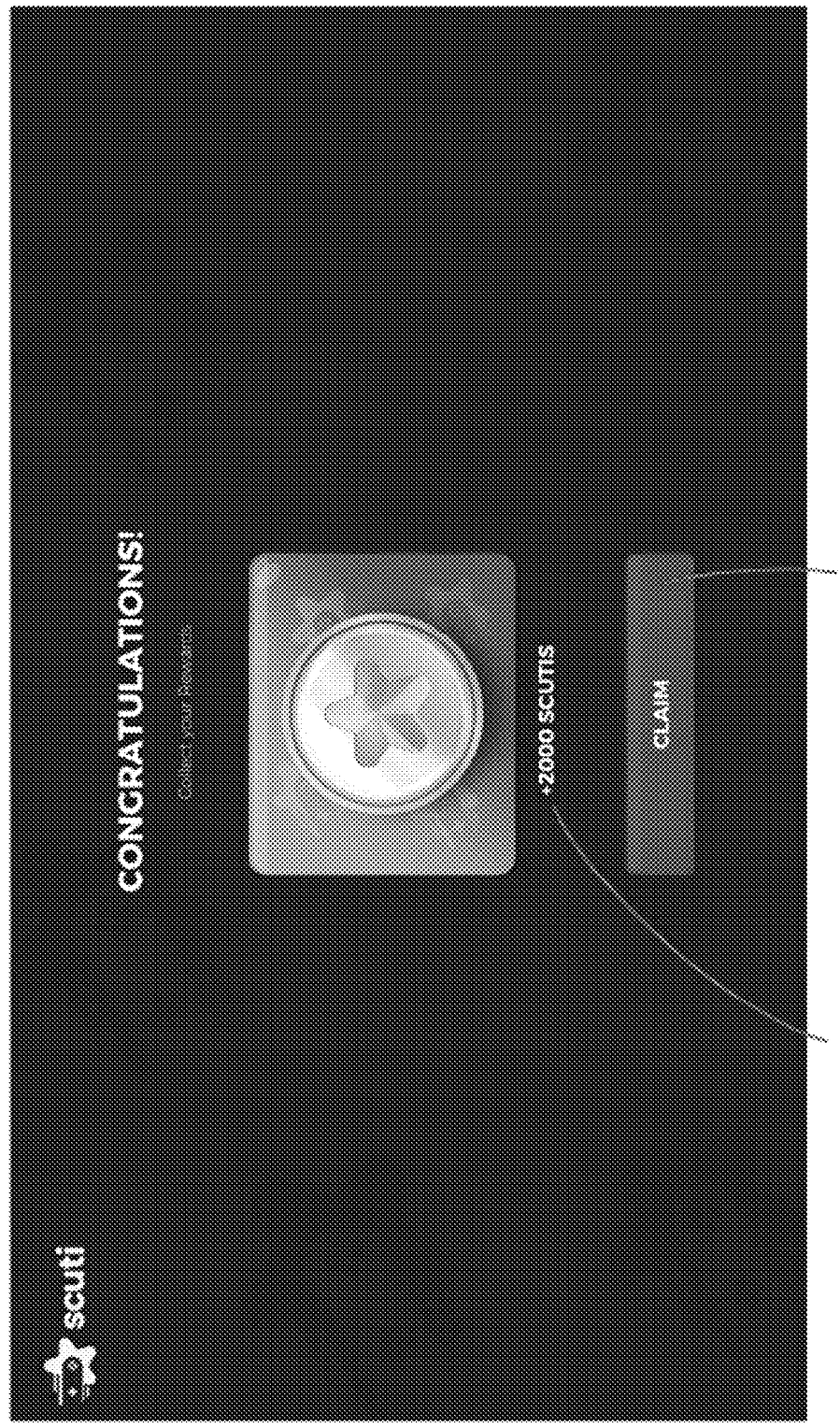

Referring to FIG. 4H, GUI 480 include interface elements that identify the number 492 of marketplace credits awarded to the user and available for redemption or exchange, and a claim icon 494. In some instances, the user may provide additional input to customer computing device 110A that selects claim icon 494, and based on the additional input, executed gaming application 302 may perform operations that generate and transmit, to marketplace platform system 120 across network 118, a request to redeem or exchange the marketplace credits. Based the received request, marketplace platform system 120 may perform any of the exemplary processes described herein to exchange the credits for in-game credits or rewards for the corresponding game environment (e.g., as established by executed gaming application 302).

Figure 5A:
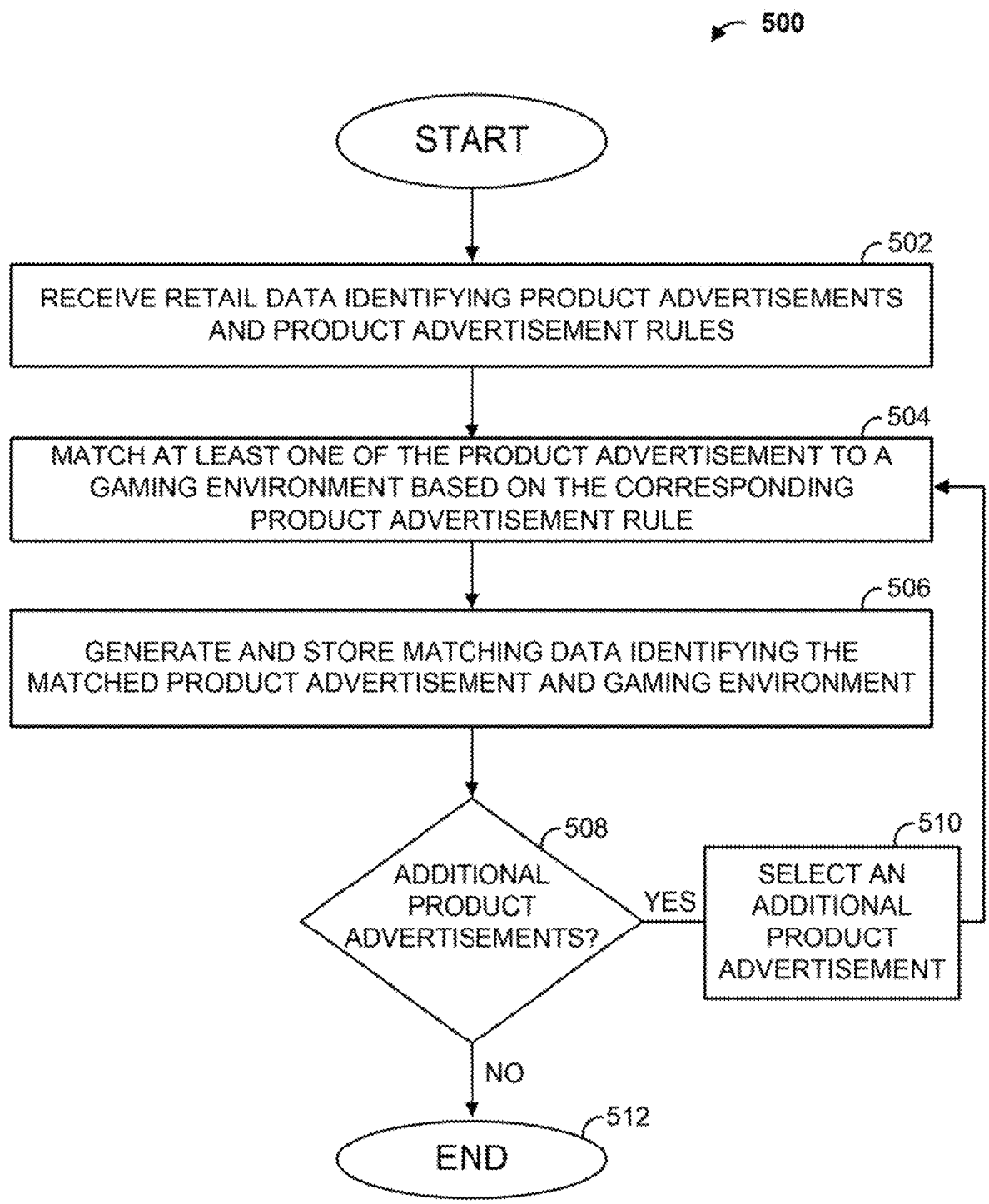
FIGS. 5A and 5B are flowcharts of exemplary processes for matching game environments and product advertisements, in accordance with some embodiments.

FIG. 5A is a flowchart of an exemplary process 500 selecting one or more elements of advertising content that are appropriate to a particular gaming environment, consistent with certain exemplary embodiments. In some examples, a computing system associated with an electronic marketplace platform within environment 100, such as marketplace platform system 120, may perform one or more of the exemplary steps of process 500.

In some instances, marketplace platform system 120 may perform any of the exemplary processes described herein to receive, obtain, or load retail data that, among other things, identifies one or more product advertisements and one or more rules associated with each of the product advertisement (e.g., in step 502 of FIG. 5A). For example, and as described herein, data warehouse 116 may maintain data identifying and characterizing the one or more product advertisements, and in step 502, marketplace platform system 120 may perform operations that access data warehouse 116 and obtain elements of the maintained data that identify and characterize at least one product advertisement, such as product advertisement 452A of FIG. 4D. Further, and as described herein, the obtained data may also specify at least rule for the product advertisement, such as, but not limited to, a rule specifying one or more genres of games permitted to present the at least one product advertisement, e.g., action, role playing, etc.

Based on one or more product advertisement rules, marketplace platform system 120 may also perform any of the exemplary processes described herein to identify one or more gaming environments, and corresponding gaming applications, having characteristics that are consistent with, or match, the at least one product advertisement rule (e.g., in step 504 of FIG. 5A). For example, marketplace platform system 120 may perform operations that access data warehouse 116, and obtain elements of gaming data that identify and characterize a plurality of candidate gaming environments and corresponding gaming applications. As described herein, the obtained gaming data may identify, among other things, a gaming genre associated with each of the gaming environments and gaming application, and based on the obtained gaming data, marketplace platform system 120 may determine at least one of the gaming environments and corresponding gaming applications having a gaming genre consistent with at least one product advertisements rule.

Marketplace platform system 120 may further generate elements of matching data that associate the at least one product advertisement with each of the matched gaming environments, and gaming applications, and that store the matching data within a data repository, such as data warehouse 116. In some instances, the matching data identifies and characterizes the matched product advertisement(s) and the gaming environment(s) and corresponding gaming application(s). For example, and for a particular product advertisement, the matching data may identify a set of candidate gaming environment(s) and corresponding gaming application(s) that may display the particular product advertisement in accordance with the specific product advertisement rule.

Marketplace platform system 120 may further parse data warehouse 116 to determine whether additional product advertisements require processing (e.g., in step 508 of FIG. 5A), and if product advertisements require processing (e.g., step 508; YES), marketplace platform system 120 may perform any of the exemplary processes described herein to select an additional one of the product advertisements for processing (e.g., in step 510), and exemplary process 500 may pass back to step 504 described herein. Alternatively, if marketplace platform system 120 were to determine that no additional product advertisements require processing (e.g., step 508; NO), exemplary process 500 is then complete in step 512.

Figure 5B:
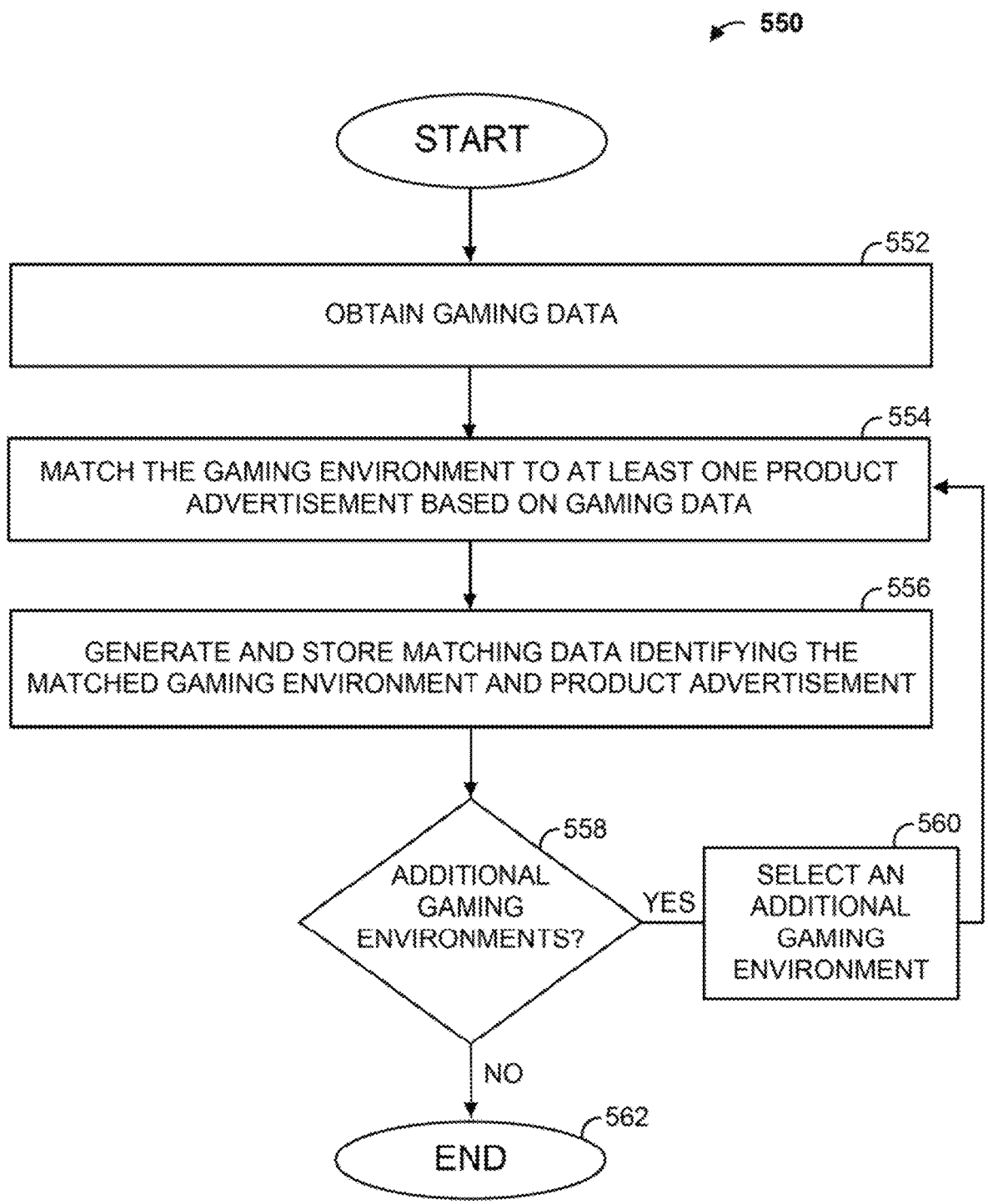

FIG. 5B is a flowchart of an additional exemplary process 550 selecting one or more elements of advertising content that are appropriate to a particular gaming environment, consistent with certain exemplary embodiments. In some examples, a computing system associated with an electronic marketplace platform within environment 100, such as marketplace platform system 120, may perform one or more of the exemplary steps of process 550.

In some instances, marketplace platform system 120 may perform any of the exemplary processes described herein to receive, obtain, or load retail gaming data that, among other things, identifies one or more gaming environments and corresponding gaming applications, along with one or more rules associated with each of the gaming environments and corresponding gaming applications (e.g., in step 552 of FIG. 5A). For example, and as described herein, data warehouse 116 may maintain gaming data identifying and characterizing the one or more gaming environments and corresponding gaming applications, and in step 502, marketplace platform system 120 may perform operations that access data warehouse 116 and obtain elements of the maintained gaming data that identify and characterize at least one gaming environment and corresponding gaming application, such as the gaming environment and gaming application associated with name 441 of FIG. 4C. Further, and as described herein, the obtained data may also specify one or more rules for the gaming environment and gaming application (e.g., "gaming" rules), such as, but not limited to, a gaming rule specifying no product advertisements associated a specified product category may be displayed to a user within the gaming environment or by the corresponding gaming application.

Based on one or more gaming rules, marketplace platform system 120 may also perform any of the exemplary processes described herein to identify one or more product advertisements having characteristics that are consistent with, or match, the one or more gaming rules of a selected one of the gaming environments and corresponding gaming applications (e.g., in step 554 of FIG. 5B). For example, marketplace platform system 120 may perform operations that access data warehouse 116, and obtain elements of retail data that identify and characterize a plurality of candidate product advertisements. As described herein, the obtained retail data may include, among other things, a product identifier (e.g., a product name) and a product type or class (e.g., shoes) associated with each of the candidate product advertisements, and based on the obtained product data, marketplace platform system 120 may determine at least one of the product advertisements that is associated with a product type or class and consistent with one or more gaming rules of the selected gaming environment or gaming application (e.g., product advertisement 452A of FIG. 4D).

Marketplace platform system 120 may further generate elements of matching data that associate the selected gaming environment or gaming application with the at least one matched product advertisement, and that store the matching data within a data repository, such as data warehouse 116 (e.g., in step 556 of FIG. 5B). In some instances, the matching data identifies and characterizes the matched product advertisement(s) and the selected gaming environment and corresponding gaming application. For example, and for the selected gaming environment and corresponding gaming application, the matching data may identify a set of candidate product advertisement(s) appropriate for disclose within the selected gaming environment and gaming application with the one or more gaming rules.

Marketplace platform system 120 may further parse data warehouse 116 to determine whether additional gaming environment and gaming applications require processing (e.g., in step 558 of FIG. 5B), and if additional gaming environments and gaming systems require processing (e.g., step 558; YES), marketplace platform system 120 may perform any of the exemplary processes described herein to select an additional one of the gaming environments and gaming systems for processing (e.g., in step 5560 of FIG. 5B), and exemplary process 560 may pass back to step 554 described herein. Alternatively, if marketplace platform system 120 were to determine that no additional gaming environments and gaming systems require processing (e.g., step 558; NO), exemplary process 560 is then complete in step 562.

Once matched, the method proceeds to step 556, where game advertisement data is stored in a database, such as in a database of data warehouse 116. The game advertisement data identifies and characterizes the matched product advertisement and game. For example, game advertisement data for the game may identify a set of candidate product advertisements that may be displayed to a user playing the game.

Figure 6:
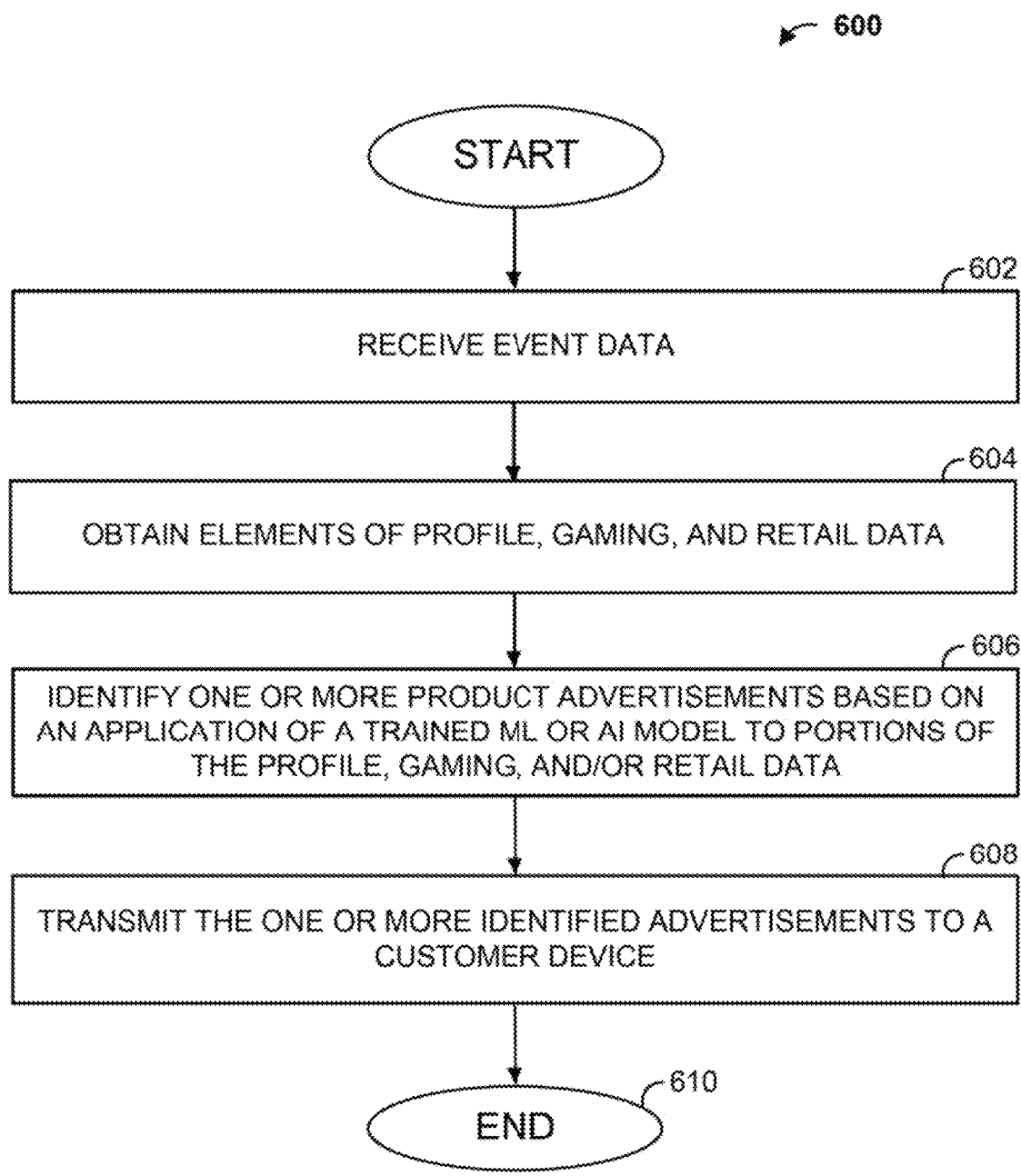
FIG. 6 is a flowchart of an exemplary process for providing product advertisements for a user, in accordance with some embodiments.

FIG. 6 is a flowchart of an exemplary process 600 for provisioning product advertisements to a user within a digital content presented by an executed application program, consistent with certain disclosed embodiments. In some examples, a computing system associated with an electronic marketplace platform within environment 100, such as marketplace platform system 120, may perform one or more of the exemplary steps of process 550.

As illustrated in FIG. 6, marketplace platform system 120 may receive event data identifying and characterizing an interaction between a user of computing device (e.g., the user of customer computing device 110A of FIG. 3) and elements of digital content presented to the user by an application program executed by that customer computing device 110A (e.g., in step 602). For example, and as described herein, customer computing device 110A may execute gaming application 302 that integrates an SDK 304 associated with, and provisioned by, marketplace platform system 120, and executed gaming application 302 may cause customer computing device 110A to present, within a corresponding gaming interface, elements of digital content that collectively establish a gaming environment that facilitates interaction between the user and a corresponding video game.

In some instances, marketplace platform system 120 may receive the event data from executed gaming application 302 via a secure, programmatic channel of communication, and the received event data may identify and characterize both the user and the gaming environment (and corresponding video game) established by executed gaming application 302. For example, event data 301 may identify the gaming environment through a corresponding game identifier (e.g., game name 441 of FIG. 4C), and may identify the user by a corresponding user identifier (e.g., a login credential, such as a username).

Marketplace platform system 120 may perform operations that access data warehouse 116, and obtain elements of profile data associated with the user identifier, elements of gaming data associated with game identifier, and elements of retail data identifying and characterizing one or more candidate product advertisements available for presentation within the gaming environment (e.g., in step 604). Further, and using any of the exemplary processes described herein, marketplace platform system 120 may apply a trained ML or AI model to a determined set of input data that includes all, or a selected portion, of elements of profile, gaming, and retail data (along with the elements of event data described herein), and based on the application of the trained ML or AI model, marketplace platform system 120 may identify one or more product advertisements appropriate to the user and for display within the ongoing gaming environment established by executed gaming application 302 (e.g., in step 606).

Marketplace platform system 120 may also perform any of the exemplary processes described herein to transmit the one or more identified product advertisements across network 118 to customer computing device 110A (e.g., in step 608). As described herein, executed gaming application 302 may perform any of the processes described herein to store the one or more product advertisements within a locally accessible data repository, and further, to present the one or more advertisements as part of a marketplace GUI that obscures all or a selected portion of the digital content associated with the ongoing gaming environment established by executed gaming application 302, e.g., in response to a detection selection of marketplace icon and the presentation of GUI 450 of FIG. 4D. Exemplary process 600 is then complete in step 610

Figure 7:
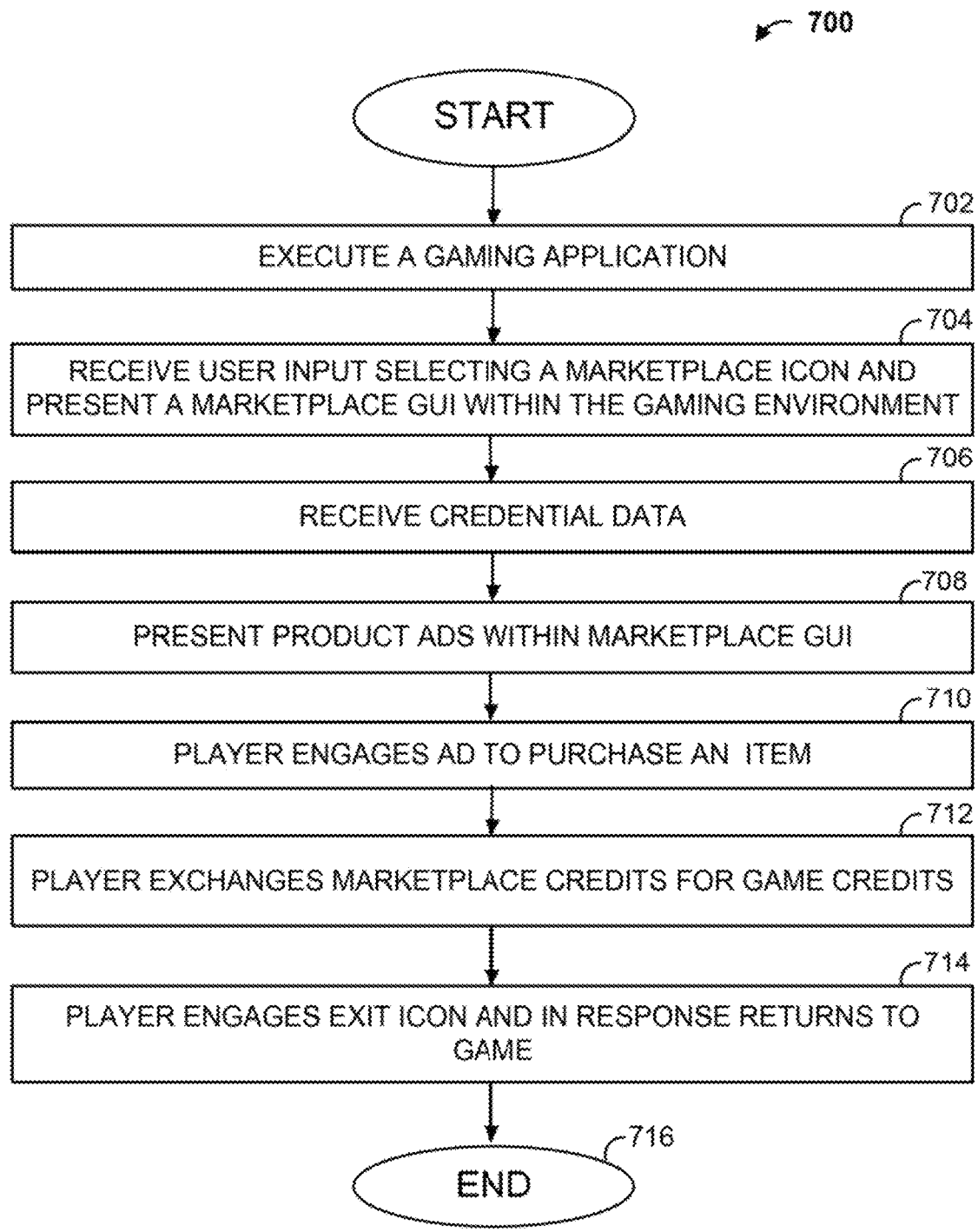
FIG. 7 is a flowchart of an exemplary process for obtaining and exchanging marketplace credits, in accordance with some embodiments.

FIG. 7 is a flowchart of an exemplary process 700 for allocating, redeeming, and exchanging marketplace credits, consistent with certain disclosed embodiments. In some examples, one or more computing systems or devices operating within environment 100, such as a customer computing device (e.g., a corresponding one of customer computing device 110A, 110B, or 110C) and marketplace platform system 120, may perform one or more of the exemplary steps of process 700.

In FIG. 7, the customer computing device may execute an application program, such as a gaming application that establishes a digital environment (e.g., a gaming environment) with which a corresponding user may interaction (e.g., in step 702). In some instances, the execution of the gaming application may enable the user to "play" a corresponding video game and enables that user to enter the gaming environment, and the executed gaming application may be provisioned to the customer computing device by a corresponding one of content provider computing devices 114A or 114b.

In some instances, the executed gaming application may present, to the user, one or more elements of digital content within a corresponding gaming interface (e.g., that collectively establish the gaming environment) along with one or more selectable interface elements, such as a marketplace icon associated with marketplace platform system 120. The customer computing device may, for example, receive input from the user selecting the marketplace icon, and based on the received input, the executed gaming application (e.g., that integrated the SDK associated with marketplace platform system 120) may cause the customer computing device to generate and present a marketplace GUI within the corresponding gaming interface to the user (e.g., in step 704). The marketplace GUI may, for example, obscure all or a selected portion of the digital content establishing the gaming environment, and may enable the user to interact with the marketplace platform system 120 within exiting the gaming environment.

Responsive to the presentation of the marketplace GUI, the customer computing device receives further input specifying one or more elements of credential data associated with the user, and may route the elements of credential data, along with additional information identifying the executed gaming application, to marketplace platform system 120 (e.g., in step 706). In some examples, marketplace platform system 120 may perform operations that authenticate the credential data, and access one or more elements of profile data associated with the user, e.g., as maintained within data warehouse 116. As described herein, the elements of profile data may identify and characterize the user, and may include, but is not limited to, billing information and contact information (e.g., address, phone number) for the user. Through an implementation of any of the exemplary processes described herein, marketplace platform system 120 may identify one or more product advertisements appropriate for presentation within the marketplace GUI (e.g., in step 708), and transmit the one or more product advertisements to the customer computing device, e.g., for storage in a locally accessible data repository.

Referring back to FIG. 7, the executed gaming application may present all, or a selected subset, of the identified product advertisements within the marketplace GUI (e.g., in step 710), and the customer computing device may receive further input indicative of a request, by the user, to purchase a product or service associated with one of the presented products advertisements without existing the gaming environment (e.g., in step 712). For example, and within a particular one of the presented advertisements, the further input may be associated with a selection of an interface elements that adds the product of service to the user's online shopping cart (e.g., the selection of add-to-cart icon 462 of FIG. 4E), and the selection of an additional interface elements that initiates the purchase using the account information maintained within the profile data associated with the user (e.g., the selection of checkout icon 474A of FIG. 4F). In response to the further input, the customer computing device may transmit a purchase request to marketplace platform system 120, which may perform any of the exemplary processes described herein to complete the purchase and allocate the user with a specific number of marketplace credits associated with the now-purchased item.

Further, in some instances, the customer computing device may also receive input indicative of a decision, by the user, to exchange all or a selected subset of the allocated marketplace credits for in-game credits usable within the ongoing gaming environment (e.g., in step 712). For example, the received input (e.g., in step 712) may be indicative of a selection, by the user, of an additional interface element within the marketplace GUI (e.g., claim icon 494 of FIG. 4H) associated with the exchange of the allocated marketplace credits for in-game credits based on a predetermined or dynamically changing exchange ratio (e.g., currency value 449). At step 714, the user provides further input to the customer computing devices exists the marketplace GUI, and the executed gaming application may perform operations that remove the marketplace GUI from the gaming interface, e.g., without removing the user from the gaming environment. Exemplary process 700 is then complete in step 716.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, computer program code segments configure the processor to create specific logic circuits. The methods may alternatively be at least partially embodied in application specific integrated circuits for performing the methods.

The subject matter has been described in terms of exemplary embodiments. Because they are only examples, the claimed inventions are not limited to these embodiments. Changes and modifications may be made without departing the spirit of the claimed subject matter. It is intended that the claims cover such changes and modifications.

What is claimed is:
1. An apparatus, comprising:
a transceiver device;
a non-transitory, computer-readable medium storing executable instructions; and
at least one processor coupled to the transceiver device and the computer-readable medium, the at least one processor being configured to execute the executable instructions to cause the apparatus to:
receive a first signal from a computing device via the transceiver device, the computing device being operable by a user, and the first signal comprising an identifier of the user and an identifier of a gaming application executed by the computing device;
based on the user identifier, obtain event data identifying at least one previous interaction between the user and a first digital interface associated with a digital platform that serves a plurality of gaming applications, the plurality of gaming applications including the executed gaming application;
apply a trained machined learning process to portions of the event data and retail data identifying a plurality of product advertisements;
based on the application of the trained machine learning process to the portions of the event data and the retail data, determine at least one product advertisement for the user;
generate advertisement data that includes the at least one product advertisement, and transmit the advertisement data to the computing device via the transceiver device, the executed gaming application causing the computing device to present digital content associated with the executed gaming application within a second digital interface associated with the gaming application and to present the at least one product advertisement within the second digital interface, the second digital interface being different from the first digital interface, the at least one presented product advertisement obscuring a portion of the digital content associated with the executed gaming application within the second digital interface, and the executed gaming application further causing the computing device to generate, and transmit to the apparatus, a request for an exchange of data associated with the at least one product advertisement, the request being generated and transmitted without exiting a gaming environment associated with the executed gaming application; and
receive the request from the computing device via the transceiver device and to perform operations that execute the requested data exchange.
2. A computer-implemented method, comprising:
receiving, using at least one processor, a first signal from a computing device, the computing device being operable by a user, and the first signal comprising an identifier of the user and an identifier of a gaming application executed by the computing device;
based on the user identifier, and using the at least one processor, obtaining event data identifying at least one previous interaction between the user and a first digital interface associated with a digital platform that serves a plurality of gaming applications, the plurality of gaming applications including the executed gaming application;
applying, using the at least one processor, a trained machined learning process to portions of the event data and obtaining retail data identifying a plurality of product advertisements;
based on the application of the trained machine learning process to the portions of the event data and the retail data, determining, using the at least one processor, at least one product advertisement for the user;

using the at least one processor, generating advertisement data that includes the at least one product advertisement, and transmitting the advertisement data to the computing device using the at least one processor, the executed gaming application causing the computing device to present digital content associated with the executed gaming application within a second digital interface associated with the gaming application and to present the at least one product advertisement within the second digital interface, the second digital interface being different from the first digital interface, the at least one presented product advertisement obscuring a portion of the digital content associated with the executed gaming application within the second digital interface, and the executed gaming application further causing the computing device to generate and transmit a request for an exchange of data associated with the at least one product advertisement, the request being generated and transmitted without exiting a gaming environment associated with the executed gaming application; and using the at least one processor, receiving the request from the computing device and performing operations that execute the requested data exchange.

3. A non-transitory, machine-readable storage medium storing instructions that, when executed by at least one processor, cause the at least one processor to perform operations comprising:

receiving a first signal from a computing device, the computing device being operable by a user, and the first signal comprising an identifier of the user and an identifier of a gaming application executed by the computing device;

based on the user identifier, obtaining event data identifying at least one previous interaction between the user and a first digital interface associated with a digital platform that serves a plurality of gaming applications, the plurality of gaming applications including the executed gaming application;

applying a trained machined learning process to portions of the event data and retail data identifying a plurality of product advertisements;

based on the application of the trained machine learning process to portions of the event data and the retail data, determining at least one product advertisement for the user;

generating advertisement data that includes the at least one product advertisement, and transmitting the advertisement data to the computing device using the at least one processor, the executed gaming application causing the computing device to present digital content associated with the executed gaming application within a second digital interface associated with the gaming application and to present the at least one product advertisement within the second digital interface, the second digital interface being different from the first digital interface, the at least one presented product advertisement obscuring a portion of the digital content associated with the executed gaming application within the second digital interface, and the executed gaming application further causing the computing device to generate and transmit a request for an exchange of data associated with the at least one product advertisement, the request being generated and transmitted without exiting a gaming environment associated with the executed gaming application; and receiving the request from the computing device and performing operations that execute the requested data exchange.

4. The computer-implemented method of claim 2, wherein:

the computer-implemented method further comprises generating, using the at least one processor, elements of input data based on the portions of the event data and the retail data;

the applying comprises applying the trained machine learning process to the elements of input data; and the determining comprises determining the at least one of the product advertisements for the user based on the application of the trained machine learning process to the elements of input data.

5. The computer-implemented method of claim 4, wherein:

the event data further identifies at least one prior interaction between the user and the executed gaming application; and generating the elements of input data comprises generating the elements of input data based on (i) the portions of the event data that identify the at least one previous interaction between the user and the first digital interface and the at least one prior interaction between the user and the executed gaming application and (ii) the portion of the retail data.

6. The computer-implemented method of claim 4, wherein:

the computer-implemented method further comprises obtaining, using the at least one processor, and based the user identifier, profile data that identifies and characterizes the user; and generating the elements of input data further comprises generating the elements of input data based on the portion of the event data that identifies the at least one previous interaction between the user and the first digital interface, the portion of the retail data, and at least a portion of the profile data.

7. The computer-implemented method of claim 6, wherein:

each of the product advertisements is associated with a corresponding product available within the digital platform;

the computer-implemented method further comprises obtaining, using the at least one processor, and based on the identifier of the executed gaming application, elements of application data associated with the executed gaming application, the elements of application data identifying a subset of the products that are available through the digital platform and associated with the executed gaming application; and generating the elements of input data further comprises generating the elements of input data based on the portion of the event data that identifies the at least one previous interaction between the user and the first digital interface, the portions of the retail data and the profile data, and at least a portion of the application data.

8. The apparatus of claim 1, wherein the at least one processor is further configured to execute the instructions to cause the apparatus to:

receive at least a portion of the event data from the computing device via the transceiver device;

receive at least a portion of the retail data from a computing system via the transceiver device; and perform operations that store the received portions of the event and retail data within the non-transitory, computer-readable medium.

9. The apparatus of claim 1, wherein the at least one processor is further configured to execute the instructions to cause the apparatus to:

generate elements of input data based on the portions of the event data and the retail data;

apply the trained machine learning process to the elements of input data; and based on the application of the trained machine learning process to the elements of input data, determine the at least one of the product advertisements for the user.

10. The apparatus of claim 9, wherein:

the event data further identifies at least one prior interaction between the user and the executed gaming application; and the at least one processor is further configured to execute the instructions to cause the apparatus to generate the elements of input data based on (i) the portions of the event data that identify the at least one previous interaction between the user and the first digital interface and the at least one prior interaction between the user and the executed gaming application and (ii) the portion of the retail data.

11. The apparatus of claim 9, wherein the at least one processor is further configured to execute the instructions to cause the apparatus to:

based the user identifier, obtain profile data that identifies and characterizes the user; and generate the elements of input data based on the portion of the event data that identifies the at least one previous interaction between the user and the first digital interface, the portion of the retail data, and at least a portion of the profile data.

12. The apparatus of claim 11, wherein:

each of the product advertisements is associated with a corresponding product available within the digital platform; and the at least one processor is further configured to execute the instructions to cause the apparatus to, based on the identifier of the executed gaming application, obtain elements of application data associated with the executed gaming application, the elements of application data identifying a subset of the products that are available through the digital platform and associated with the executed gaming application.

13. The apparatus of claim 12, wherein the at least one processor is further configured to execute the instructions to cause the apparatus to generate the elements of input data based on the portion of the event data that identifies the at least one previous interaction between the user and the first digital interface, the portions of the retail data and the profile data, and at least a portion of the application data.

14. The apparatus of claim 12, wherein the at least one processor is further configured to execute the instructions to cause the apparatus to:

perform operations that filter the retail data based on portions of the elements of application data, the filtered retail data identifying one or more product advertisements associated with the subset of the products; and generate the elements of input data based on the portion of the event data that identifies the at least one previous interaction between the user and the first digital interface, at least a portion of the filtered retail data, and the portion of the profile data.

15. The apparatus of claim 1, wherein:

the digital content comprises an interface element associated with the first digital interface; and the computing device is further configured to receive input data associated a selection of the interface element, and based on the input data, perform operations that present the at least one product advertisement within the first digital interface, the first digital interface obscuring at least the portion of the digital content.

16. The apparatus of claim 1, wherein:

the at least one product advertisement is associated with a corresponding product available within the digital platform;

the at least one processor is further configured to execute the instructions to cause the apparatus to:

receive request data from the customer device via the transceiver device, the request data characterizing a request to initiate an exchange of data involving the corresponding product;

perform operations that execute the requested data exchange based on the elements of request data, and based on the executed data exchange, perform operations that allocate one or more digital assets to the user; and store data characterizing the allocated digital assets the non-transitory, computer-readable medium.

17. The apparatus of claim 1, wherein the at least one processor is further configured to execute the instructions to cause the apparatus to:

receive request data from the customer device via the transceiver device, the request data characterizing a request to redeem one or more digital assets allocated to the user;

based on the request data, obtain data characterizing the one or more allocated digital assets, and perform operations that redeem the one or more allocated digital assets in accordance with the obtained data and the request data; and store additional data characterizing the redemption of the portion of the allocated digital assets within the non-transitory, computer-readable medium.

18. The apparatus of claim 17, wherein the one or more digital assets are associated with an additional one of the plurality of gaming applications, the executed gaming application and the additional one of the plurality of gaming application being associated with the digital platform.

19. The apparatus of claim 16, wherein the one or more digital assets comprise one or more marketplace credits associated with the digital platform.

20. The apparatus of claim 19, wherein:

the first digital interface comprises a graphical user interface; and the executed gaming application further causes the computing device to present the graphical user interface within the second digital interface, and to present the at least one product advertisement within the graphical user interface; and the graphical user interface obscures at least the portion of the digital content.

21. The apparatus of claim 20, wherein the computing device is configured to receive input data associated with at least one interface element of the graphical user interface.

22. The apparatus of claim 1, wherein the at least one processor is further configured to execute the instructions to cause the apparatus to:
- receive, via the transceiver device, a request for an exchange of data associated with the at least one product advertisement, the request being generated by the executed gaming application, and the request being generated without existing a gaming environment associated with the executed gaming application; and
- perform operations that execute the requested data exchange.

* * * * *